(12) United States Patent
   Molina et al.

(10) Patent No.: US 12,580,517 B2
(45) Date of Patent: Mar. 17, 2026

(54) PHOTOVOLTAIC ROOFING TILE FOOT

(71) Applicant: Tesla, Inc., Austin, TX (US)

(72) Inventors: David Molina, Martinez, CA (US);
               Tommy F. Rodrigues, San Ramon, CA
               (US); Kaleb Klauber, Oakland, CA
               (US); Martin Seery, San Rafael, CA
               (US)

(73) Assignee: Tesla, Inc., Austin, TX (US)

( * ) Notice: Subject to any disclaimer, the term of this
              patent is extended or adjusted under 35
              U.S.C. 154(b) by 76 days.

(21) Appl. No.: 18/511,905

(22) Filed: Nov. 16, 2023

(65) Prior Publication Data

US 2024/0171118 A1     May 23, 2024

Related U.S. Application Data

(60) Provisional application No. 63/426,566, filed on Nov.
     18, 2022.

(51) Int. Cl.
   *H02S 20/25*     (2014.01)
   *H02S 30/10*     (2014.01)
(52) U.S. Cl.
   CPC .............. *H02S 20/25* (2014.12); *H02S 30/10*
                                              (2014.12)
(58) Field of Classification Search
   CPC ......... H02S 20/00–26; H02S 30/00–20; H02S
                                              40/00–44
   See application file for complete search history.

(56) References Cited

U.S. PATENT DOCUMENTS

| | | | | |
|---|---|---|---|---|
| 7,487,771 | B1* | 2/2009 | Eiffert | H02S 30/10 |
| | | | | 136/246 |
| 2008/0302409 | A1 | 12/2008 | Bressler et al. | |
| 2012/0291855 | A1* | 11/2012 | Lee | H02S 20/25 |
| | | | | 136/251 |
| 2013/0125482 | A1* | 5/2013 | Kalkanoglu | F24S 25/61 |
| | | | | 52/173.3 |
| 2016/0225931 | A1* | 8/2016 | Heng | H02S 40/34 |
| 2016/0380579 | A1* | 12/2016 | Gong | H02S 20/25 |
| | | | | 136/244 |
| 2017/0163206 | A1* | 6/2017 | Rodrigues | H02S 40/36 |
| 2018/0375463 | A1* | 12/2018 | Gorny | H02S 40/36 |
| 2022/0209708 | A1* | 6/2022 | Hakenberg | E04D 1/2935 |

OTHER PUBLICATIONS

International Preliminary Report on Patentability on Appl. No.
PCT/US2023/080205 dated Apr. 28, 2025, 10 pages.

* cited by examiner

*Primary Examiner* — Bach T Dinh
(74) *Attorney, Agent, or Firm* — Foley & Lardner LLP

(57)     ABSTRACT

A configuration for a foot for a PV (PV) roofing tile is
described. The foot optionally includes multiple retaining
features that are engaged by hooks or brackets of adjacent
roofing tiles to prevent upward movement of roofing tiles
located up roof from the foot. The foot optionally also
positions the PV roofing tile a fixed distance above a roofing
substrate without the need for applying a set of battens atop
the roofing substrate. Non-PV roofing tiles compatible with
the describe foot are also described. The non-PV roofing tile
is optionally configured so that it can be cut into smaller
pieces as needed to fill small openings on a roof top.

20 Claims, 23 Drawing Sheets

412

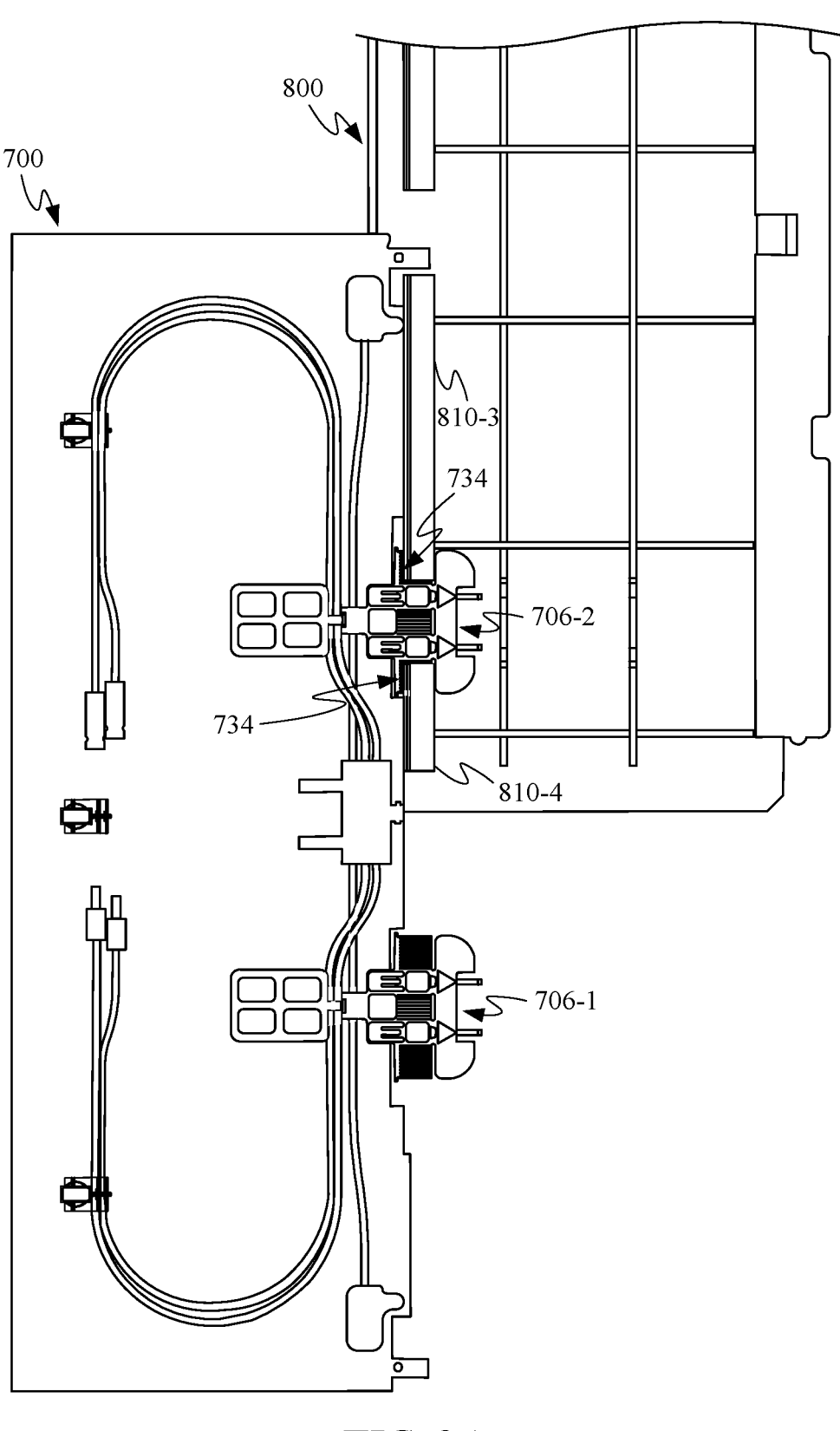
_FIG. 9A_

PHOTOVOLTAIC ROOFING TILE FOOT

CROSS-REFERENCE TO RELATED APPLICATIONS

This application claims priority to U.S. Provisional Patent Application Ser. No. 63/426,566, entitled "PHOTOVOL-TAIC ROOFING TILE FOOT", filed Nov. 18, 2022, the contents of which are hereby incorporated by reference in their entirety.

BACKGROUND

Field

This disclosure is generally related to photovoltaic (PV) roofing tiles. More specifically, this disclosure describes PV roofing tile feet with a connection interface configured to couple to up-roof PV and non-PV roofing tiles.

Related Art

In residential and commercial solar energy installations, a building's roof is typically installed with PV modules, also called PV or solar panels, that can include a two-dimensional array (e.g., 6×12) of solar cells. A PV roofing tile (or solar roofing tile) can be a particular type of PV module offering weather protection for the home and a pleasing aesthetic appearance, while also functioning as a PV module to convert solar energy to electricity. The PV roofing tile can be shaped like a conventional roofing tile and can include one or more solar cells encapsulated between a front cover and a back cover, but typically encloses fewer solar cells than a conventional solar panel.

The front and back covers can be fortified glass or other material that can protect the PV cells from the weather elements. Note that a typical roofing tile may have a dimension of 15 in×8 in=120 in$^2$=774 cm$^2$, and a typical solar cell may have a dimension of 6 in ×6 in=36 in$^2$=232 cm$^2$. Generally a PV roofing tile installation will include a mix of PV roofing tiles and non-PV roofing tiles since incorporating PV structures into every roofing tile would typically provide more energy than needed to power a typical residence. For this reason, roofing elements that can be used with both PV and non-PV roof tile modules are desirable and could improve affordability of PV roofing configurations.

SUMMARY

One embodiment can provide a PV roofing tile with feet configured to retain a forward edge of roofing tiles positioned up-roof of the PV roofing tile.

A respective PV roofing tile is disclosed and includes a protective cover; a photovoltaic (PV) tile backer; a plurality of solar cells disposed between the protective cover and the PV tile backer, the plurality of solar cells comprising a first electrical terminal proximate a first end of the PV roofing tile and a second electrical terminal proximate a second end of the PV roofing tile; a plurality of feet, each foot of the plurality of feet comprising: a standoff positioned at a first end of the foot and coupled to a downward facing surface of the PV tile backer; and a coupling assembly positioned at a second end of the foot, opposite the first end of the foot, wherein the coupling assembly defines a plurality of adjacent retaining features configured to receive and prevent upward movement of one or more portions of a roofing tile adjacent to the PV roofing tile.

A roof is disclosed and includes multiple roofing tiles. The roof includes, a first roofing tile coupled directly to a roofing substrate and comprising: a first protective cover; a first PV tile backer; a first plurality of solar cells disposed between the first protective cover and the first PV tile backer; and a plurality of feet, each foot of the plurality of feet disposed between the PV tile backer and the roofing substrate and comprising a coupling assembly protruding laterally out from beneath the PV tile backer; and a second roofing tile positioned up roof from the first roofing tile and comprising: a second protective cover; a second PV tile backer; a second plurality of solar cells disposed between the second protective cover and the second PV tile backer; and a tile hook coupled to a downward facing surface of the PV tile backer and comprising a hook portion engaged within a retaining feature of the coupling assembly of a first foot of the plurality of feet.

A "solar cell strip," "PV strip," "smaller cell," or "strip" is a portion or segment of a PV structure, such as a solar cell. A PV structure may be divided into a number of strips. A strip may have any shape and any size. The width and length of a strip may be the same or different from each other. Strips may be formed by further dividing a previously divided strip.

"Finger lines," "finger electrodes," and "fingers" refer to elongated, electrically conductive (e.g., metallic) electrodes of a PV structure for collecting carriers.

"Busbar," "bus line," or "bus electrode" refer to elongated, electrically conductive (e.g., metallic) electrodes of a PV structure for aggregating current collected by two or more finger lines. A busbar is usually wider than a finger line, and can be deposited or otherwise positioned anywhere on or within the PV structure. A single PV structure may have one or more busbars.

A "PV structure" can refer to a solar cell, a segment, or a solar cell strip. A PV structure is not limited to a device fabricated by a particular method. For example, a PV structure can be a crystalline silicon-based solar cell, a thin film solar cell, an amorphous silicon-based solar cell, a polycrystalline silicon-based solar cell, or a strip thereof.

BRIEF DESCRIPTION OF THE FIGURES

FIGS. 9A-9C show various views of coupling assemblies of feet of a PV roofing tile coupled with front bracket segments of a non-PV roofing tile.

DETAILED DESCRIPTION

Figure 1:
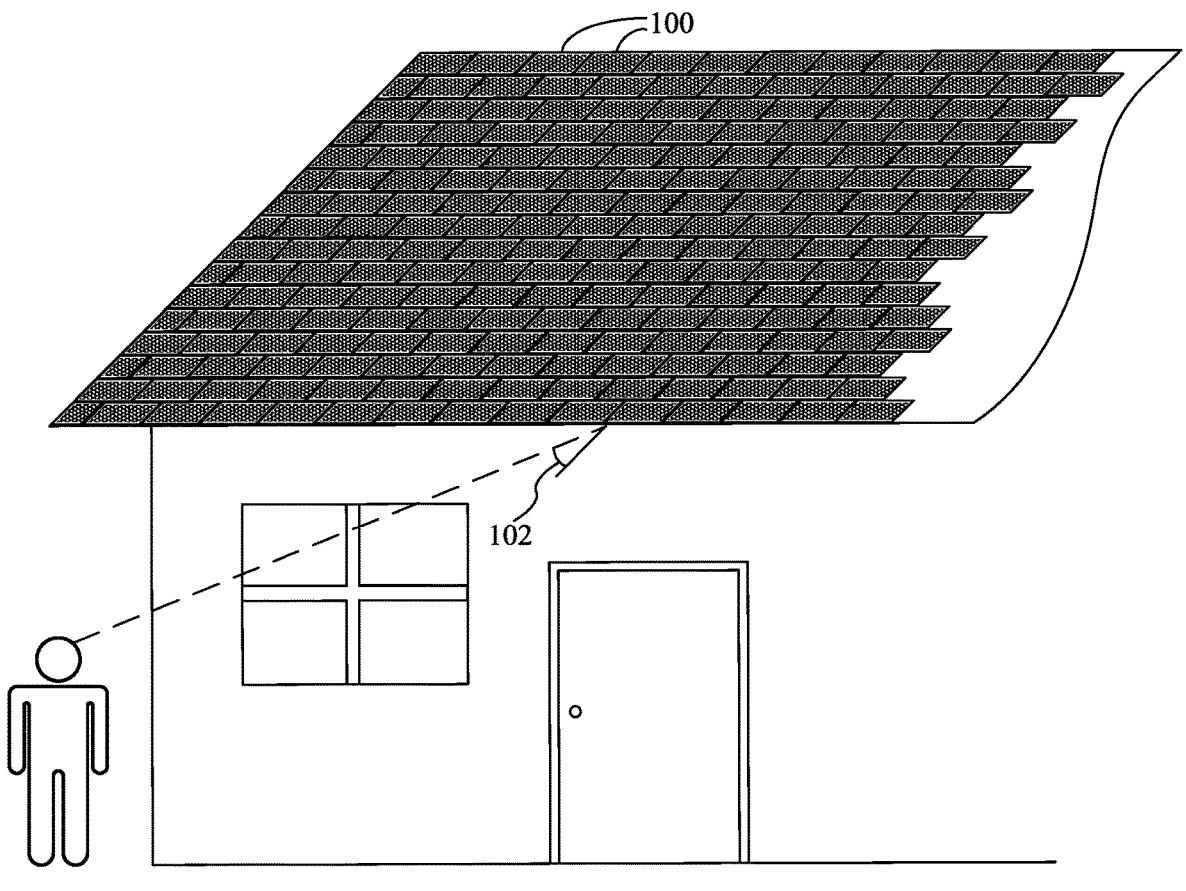
FIG. 1 shows an exemplary configuration of PV roofing tiles on a house.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the disclosed system is not limited to the embodiments shown, but is to be accorded the widest scope consistent with the principles and features disclosed herein.

Overview

Embodiments of the invention solve at least the technical problem of reducing the number of components needed to join PV and non-PV roofing tiles together. In particular, this disclosure describes a foot for a PV module capable of attaching to and securing other PV roofing tiles and non-PV roofing tiles. In particular, the foot defines a first opening for receiving a tile hook of another PV module and another two openings arranged on opposing sides of the first opening for engaging adjacent front brackets of a non-PV roof tile. In this way, a single type of foot can be used interchangeably to secure both PV and non-PV roofing tiles together.

In addition to describing a new PV roof tile foot, a number of advancements are described with regards to formation of a robust and flexible non-PV roof tile. In particular, the roof tile can be formed from sheet metal and finished to have the appearance of a PV roof tile. Formation of the roof tile from a sheet metal material results in a non-PV roof tile that can be efficiently cut to fit portions of a roof top that would not otherwise be able to accommodate a rectangular roof tile. For example, a stock rectangular non-PV roof tile can be cut to have almost any polygonal shape. A number of triangular tiles can be needed near various ridges and/or valleys of a particular roof top. A triangular of trapezoidal piece can be formed by applying one or two cuts to a non-PV roof tile. The combination of multi-use feet and non-PV roofing tiles formed from metal can substantially reduce the variety of parts needed to perform a PV roof installation.

A "solar cell" or "cell" is a PV structure capable of converting light into electricity. A cell may have any size and any shape, and may be created from a variety of materials. For example, a solar cell may be a PV structure fabricated on a silicon wafer or one or more thin films on a substrate material (e.g., glass, plastic, or any other material capable of supporting the PV structure), or a combination thereof.

A "solar cell strip," "PV strip," "smaller cell," or "strip" is a portion or segment of a PV structure, such as a solar cell. A PV structure may be divided into a number of strips. A strip may have any shape and any size. The width and length of a strip may be the same or different from each other. Strips may be formed by further dividing a previously divided strip.

"Finger lines," "finger electrodes," and "fingers" refer to elongated, electrically conductive (e.g., metallic) electrodes of a PV structure for collecting carriers.

"Busbar," "bus line," or "bus electrode" refer to elongated, electrically conductive (e.g., metallic) electrodes of a PV structure for aggregating current collected by two or more finger lines. A busbar is usually wider than a finger line, and can be deposited or otherwise positioned anywhere on or within the PV structure. A single PV structure may have one or more busbars.

A "PV structure" can refer to a solar cell, a segment, or a solar cell strip. A PV structure is not limited to a device fabricated by a particular method. For example, a PV structure can be a crystalline silicon-based solar cell, a thin film solar cell, an amorphous silicon-based solar cell, a polycrystalline silicon-based solar cell, or a strip thereof.

PV Roofing Tiles and Multi-Tile Modules

A PV roof tile (or solar roof tile) is a type of PV module shaped like a roof tile and typically enclosing fewer solar cells than a conventional solar panel. Note that such PV roofing tiles can function as both PV cells and roofing tiles at the same time. In some embodiments, the system disclosed herein can be applied to PV roofing tiles and/or other types of PV module.

FIG. 1 shows an exemplary configuration of PV roofing tiles on a house. PV roofing tiles 100 can be installed on a house like conventional roofing tiles or shingles. Particularly, a PV roof tile can be placed with other tiles in such a way as to prevent water from entering the building.

A PV roof tile can enclose multiple solar cells or PV structures, and a respective PV structure can include one or more electrodes, such as busbars and finger lines. The PV structures within a PV roof tile can be electrically and, optionally, mechanically coupled to each other. For example, multiple PV structures can be electrically coupled together by a metallic tab, via their respective busbars, to create serial or parallel connections. Moreover, electrical connections can be made between two adjacent tiles, so that a number of PV roofing tiles can jointly provide electrical power. Cosmetic features of the PV roofing tiles can allow the PV roofing tiles to blend in and look the same as non-PV roofing tiles. In some embodiments the cosmetic features can be designed to operate ideally when viewed from an angle 102.

Figure 2:
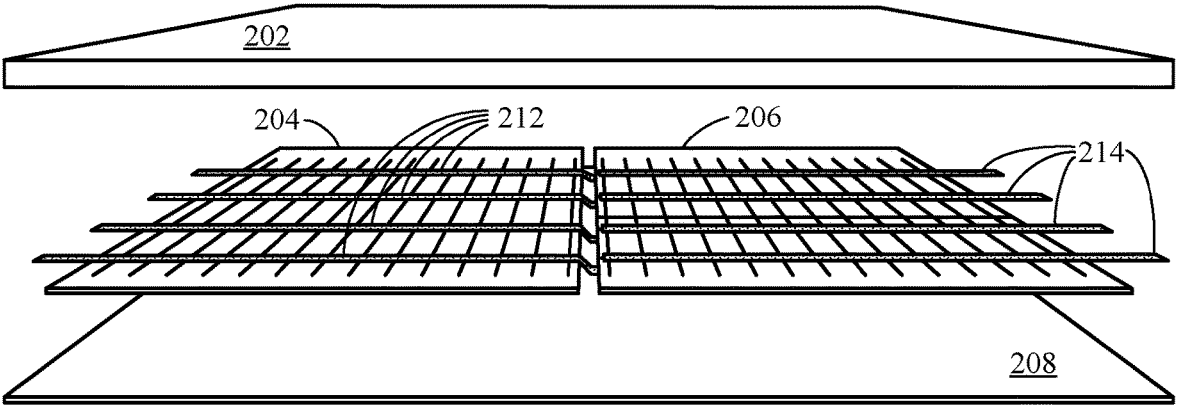
FIG. 2 shows a perspective front view of an exemplary PV roofing tile, according to an embodiment.

FIG. 2 shows a perspective view of an exemplary PV roof tile, according to an embodiment. Solar cells 204 and 206 can be hermetically sealed between top glass cover 202 and PV tile backer 208, which jointly can protect the solar cells from various weather elements. In the example shown in FIG. 2, metallic tabbing strips 212 can be in contact with the front-side electrodes of solar cell 204 and extend beyond the left edge of glass 202, thereby serving as contact electrodes of a first polarity of the PV roof tile. Tabbing strips 212 can also be in contact with the back of solar cell 206, creating a serial connection between solar cell 204 and solar cell 206. On the other hand, tabbing strips 214 can be in contact with front-side electrodes of solar cell 206 and extend beyond the right edge of glass cover 202, serving as contact electrodes of a second polarity of the PV roof tile. In some embodiments, PV tile backer 208 can be a standard PV tile backer formed from one or more layers of polymer such as, e.g., fluoropolymers or combinations of PET and EVA layers. Alternatively PV tile backer 208 can take the form of a back glass cover.

In some embodiments, array of solar cells 204 and 206 can be encapsulated between top glass cover 202 and back cover 208. A top encapsulant layer, which can be based on a polymer, can be used to seal top glass cover 202 to array of solar cells 204/206. Specifically, the top encapsulant layer may include polyvinyl butyral (PVB), thermoplastic poly-olefin (TPO), ethylene vinyl acetate (EVA), or N,N'-diphe-nyl-N,N'-bis(3-methylphenyl)-1,1'-diphenyl-4,4'-diamine (TPD). Similarly, a lower encapsulant layer, which can be based on a similar material, can be used to seal the array of solar cells to back cover 208. A PV roof tile can also contain other optional layers, such as an optical filter or coating layer or a layer of nanoparticles for providing desired color appearances. In the example of FIG. 2, module or roof tile 300 can also contains an optical filter layer between the array of solar cells and front glass cover 202.

Figure 3A:
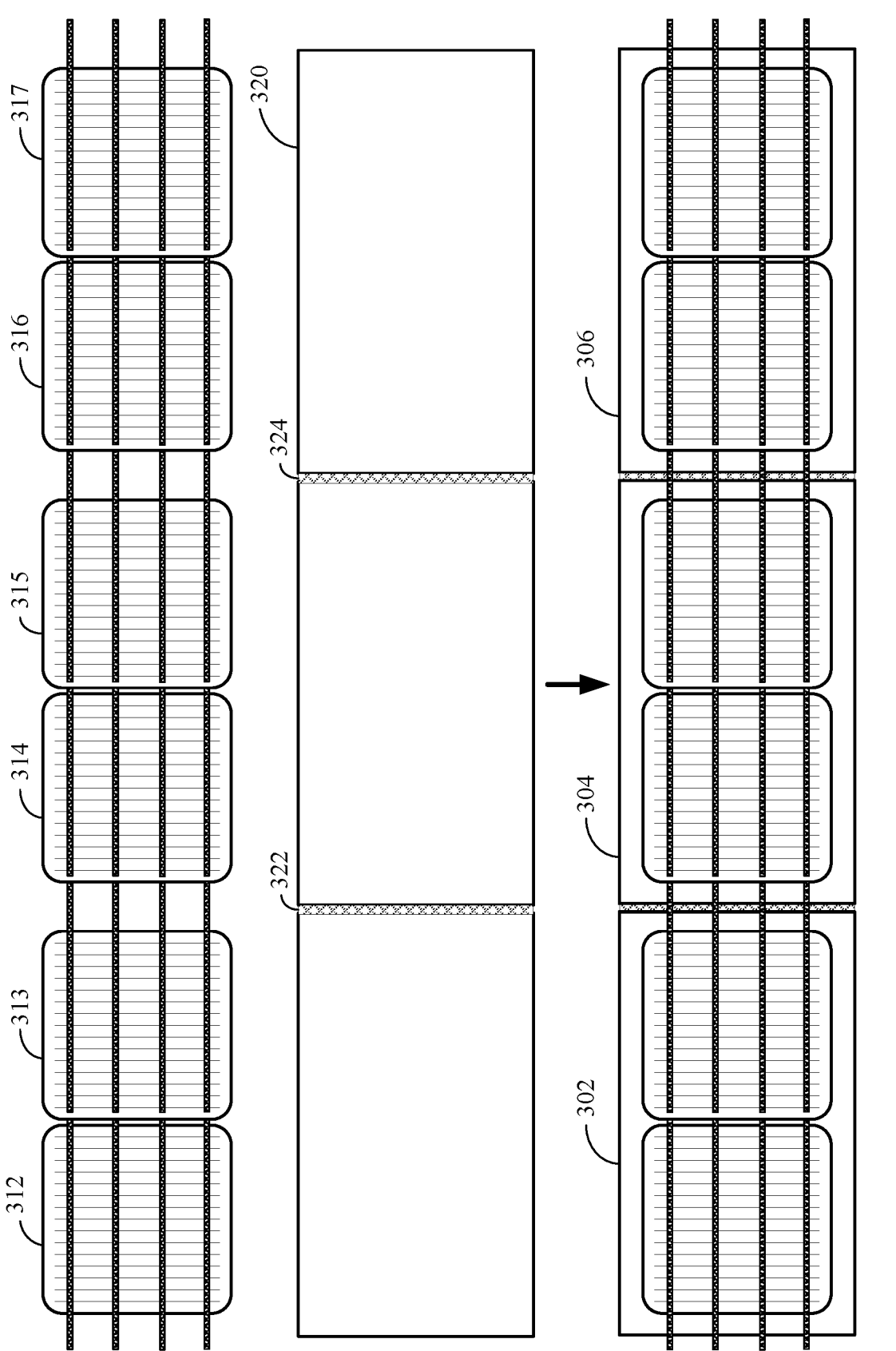
FIG. 3A shows an exemplary configuration of a multi-tile module, according to one embodiment.

To facilitate more scalable production and easier instal-lation, multiple PV roofing tiles can be fabricated together, while the tiles are linked in a rigid or semi-rigid way. FIG. 3A illustrates an exemplary configuration of a multi-tile module, according to one embodiment. In this example, three PV roofing tiles 302, 304, and 306 can be manufac-tured' establishing a semi-rigid couplings 322 and 324 between adjacent tiles. Prefabricating multiple tiles into a rigid or semi-rigid multi-tile module can significantly reduce the complexity in roof installation, because the tiles within the module have been connected with the tabbing strips. Note that the number of tiles included in each multi-tile module can be more or fewer than what is shown in FIG. 3A.

Figure 3B:
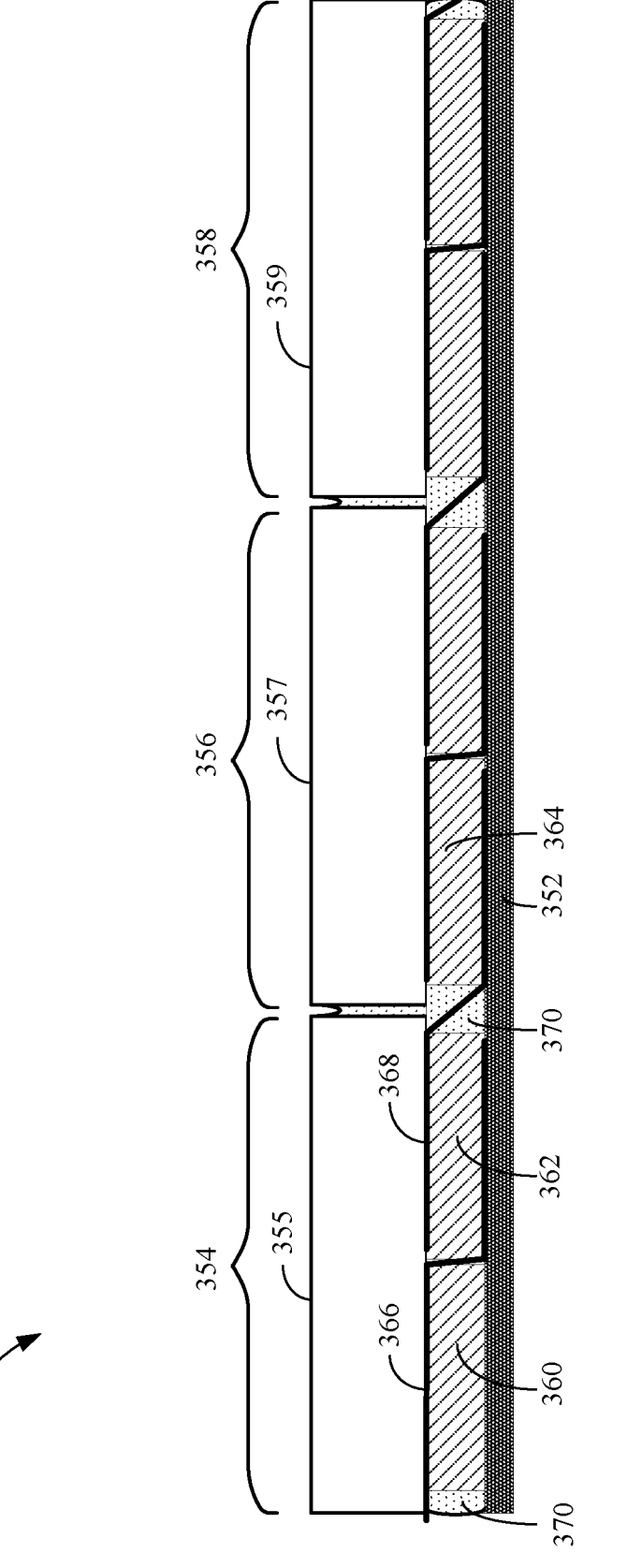
FIG. 3B shows a cross-section of an exemplary multi-tile module, according to one embodiment.

FIG. 3B illustrates a cross-section of an exemplary multi-tile module, according to one embodiment. In this example, multi-tile module 350 can include PV roofing tiles 354, 356, and 358. These tiles can share common PV tile backer 352, and have three individual glass covers 355, 357, and 359, respectively. Each tile can encapsulate two solar cells. For example, tile 354 can include solar cells 360 and 362 encapsulated between PV tile backer 352 and glass cover 355. Tabbing strips can be used to provide electrical cou-pling within each tile and between adjacent tiles. For example, tabbing strip 366 can couple the front electrode of solar cell 360 to the back electrode of solar cell 362, creating a serial connection between these two cells. Similarly, tabbing strip 368 can couple the front electrode of cell 362 to the back electrode of cell 364, creating a serial connection between tile 354 and tile 356.

Gaps 322 and 324 between adjacent PV tiles can be filled with encapsulant, protecting tabbing strips interconnecting the two adjacent tiles from the weather elements. For example, encapsulant 370 fills the gap between tiles 354 and 356, protecting tabbing strip 368 from weather elements. Furthermore, the three glass covers, PV tile backer 352, and the encapsulant together form a semi-rigid construction for multi-tile module 350. This semi-rigid construction can facilitate easier installation while providing a certain degree of flexibility among the tiles.

In addition to the examples shown in FIGS. 3A and 3B, a PV tile may include different forms of PV structures. For example, in order to reduce internal resistance, each square solar cell shown in FIG. 3A can be divided into multiple (e.g., three) smaller strips, each having edge busbars of different polarities on its two opposite edges. The edge busbars allow the strips to be cascaded one by one to form a serially connected string.

Figure 4A:
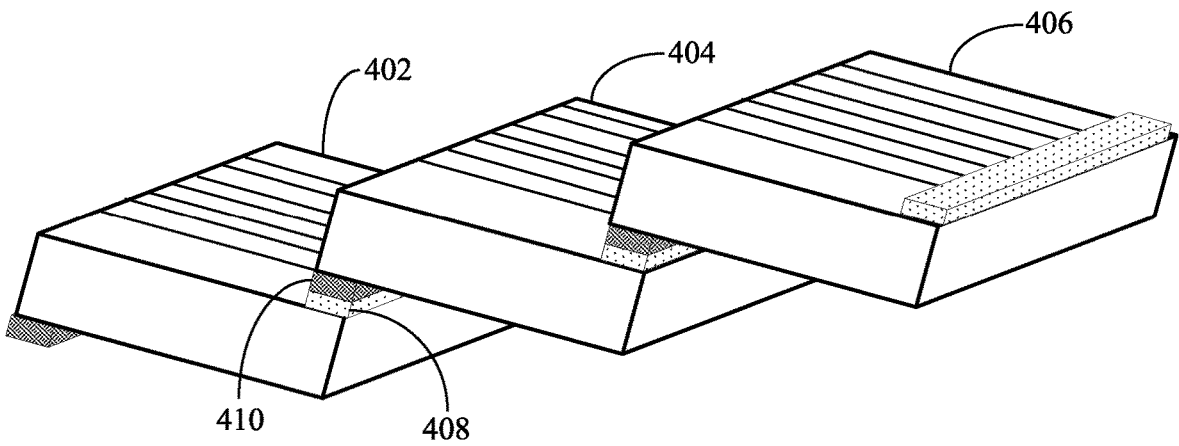
FIG. 4A illustrates a serial connection among three adjacent cascaded PV strips, according to one embodiment.

FIG. 4A illustrates a serial connection among three adja-cent cascaded PV strips, according to one embodiment. In FIG. 4A, strips 502, 504, and 506 are stacked in such a way that strip 504 partially underlaps adjacent strip 506 to its right, and overlaps strip 502 to its left. The resulting string of strips forms a cascaded pattern similar to roof shingles. Strips 502 and 504 are electrically coupled in series via edge busbar 508 at the top surface of strip 502 and edge busbar 510 at the bottom surface of strip 504. Strips 502 and 504 can be arranged in such a way that bottom edge busbar 510 is above and in direct contact with top edge busbar 508. The coupling between strips 504 and 506 can be similar.

Figure 4B:
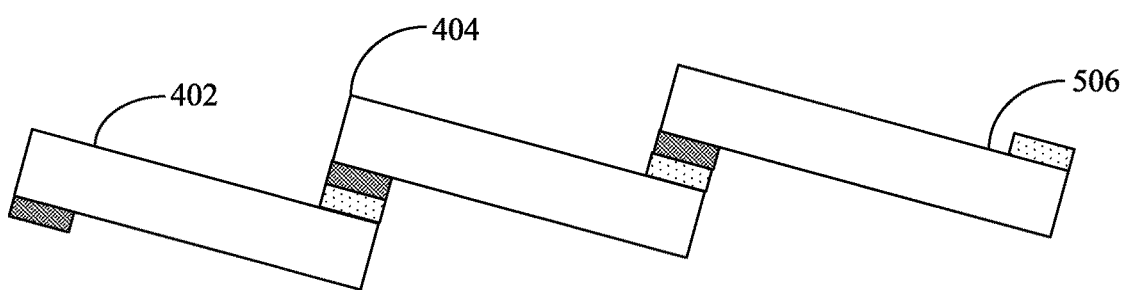
FIG. 4B illustrates a side view of the string of cascaded strips, according to one embodiment.

FIG. 4B illustrates a side view of the string of cascaded strips, according to one embodiment. In the example shown in FIGS. 4A and 4B, the strips can be segments of a six-inch square or pseudo-square solar cell, with each strip having a dimension of approximately two inches by six inches. To reduce shading, the overlapping between adjacent strips should be kept as small as possible. Therefore, in the example shown in FIGS. 4A and 4B, the single busbars (both at the top and the bottom surfaces) can be placed at or near the very edge of the strip. The same cascaded pattern can extend along multiple strips to form a serially connected string, and a number of strings can be coupled in series or parallel.

Figure 4C:
FIG. 4C illustrates an exemplary solar roofing tile, according to one embodiment.
Figure 4C:
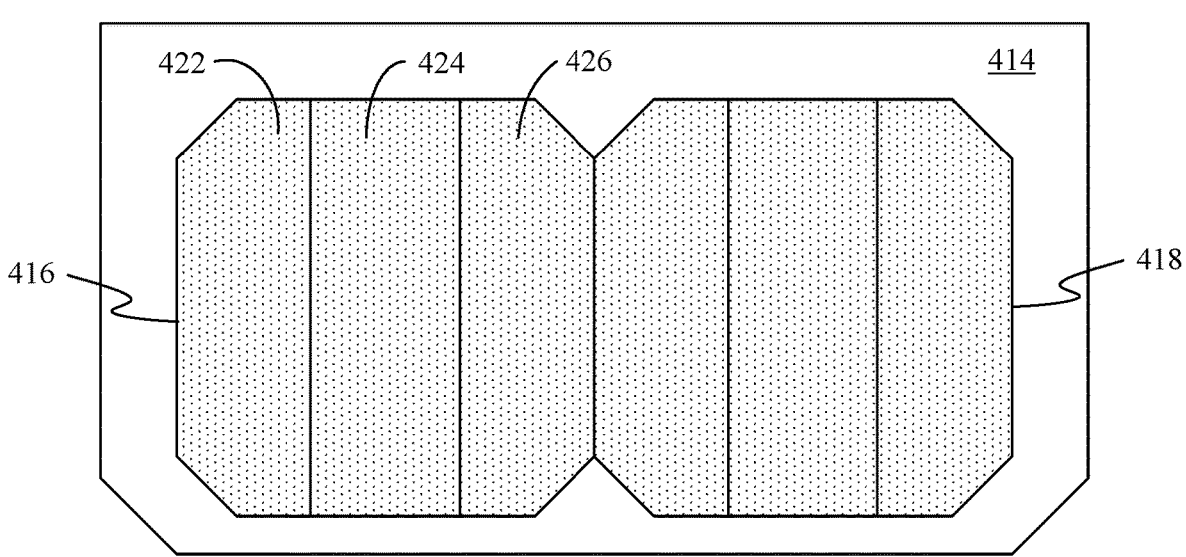

FIG. 4C illustrates an exemplary solar roof tile, according to one embodiment. A solar roof tile 412 includes top glass cover 414 and solar cells 516 and 518. The bottom cover (e.g., PV tile backer) of solar roof tile 412 is out of view in FIG. 4C. Solar cells 416 and 418 can be conventional square or pseudo-square solar cells, such as six-inch solar cells. In some embodiments, solar cells 416 and 418 can each be divided into three separate pieces of similar size. For example, solar cell 416 can include strips 422, 424, and 426. These strips can be arranged in such a way that adjacent strips are partially overlapped at the edges, similar to the ones shown in FIGS. 4A-4B. For simplicity of illustration, the electrode grids, including the finger lines and edge busbars, of the strips are not shown in FIG. 4C. In addition to the example shown in FIG. 4C, a solar roof tile can contain fewer or more cascaded strips, which can be of various shapes and size.

In some embodiments, multiple solar roofing tiles, each encapsulating a cascaded string, can be assembled to obtain a multi-tile module. Inner-tile electrical coupling has been accomplished by overlapping corresponding edge busbars of adjacent strips. However, inter-tile electrical coupling within such a multi-tile module can be a challenge. Strain-relief connectors and long bussing strips have been used to facili-tate inter-tile coupling. However, strain-relief connectors can be expensive, and arranging bussing strips after laying out the cascaded strings can be cumbersome. To facilitate low-cost, high-throughput manufacturing of the solar roof-ing tiles, in some embodiments, metal strips can be pre-laid onto the back covers of the solar tiles, forming an embedded circuitry that can be similar to metal traces on a printed circuit board (PCB). More specifically, the embedded circuitry can be configured in such a way that it facilitates the electrical coupling among the multiple solar roofing tiles within a multi-tile module.

Moreover, to facilitate electrical coupling between the embedded circuitry and an edge busbar situated on a front surface of a cascaded string, in some embodiments, a Si-based bridge electrode can be attached to the cascaded string. The Si-based bridge electrode can include a metallic layer covering its entire back surface and, optionally, a back edge busbar. By overlapping its edge (e.g., back edge busbar) to the front edge busbar of the cascaded string, the Si-based bridge electrode can turn itself into an electrode for the cascaded string, converting the forwardly facing electrode of the cascaded string to an electrode accessible from the back side of the cascaded string.

Figure 5A:
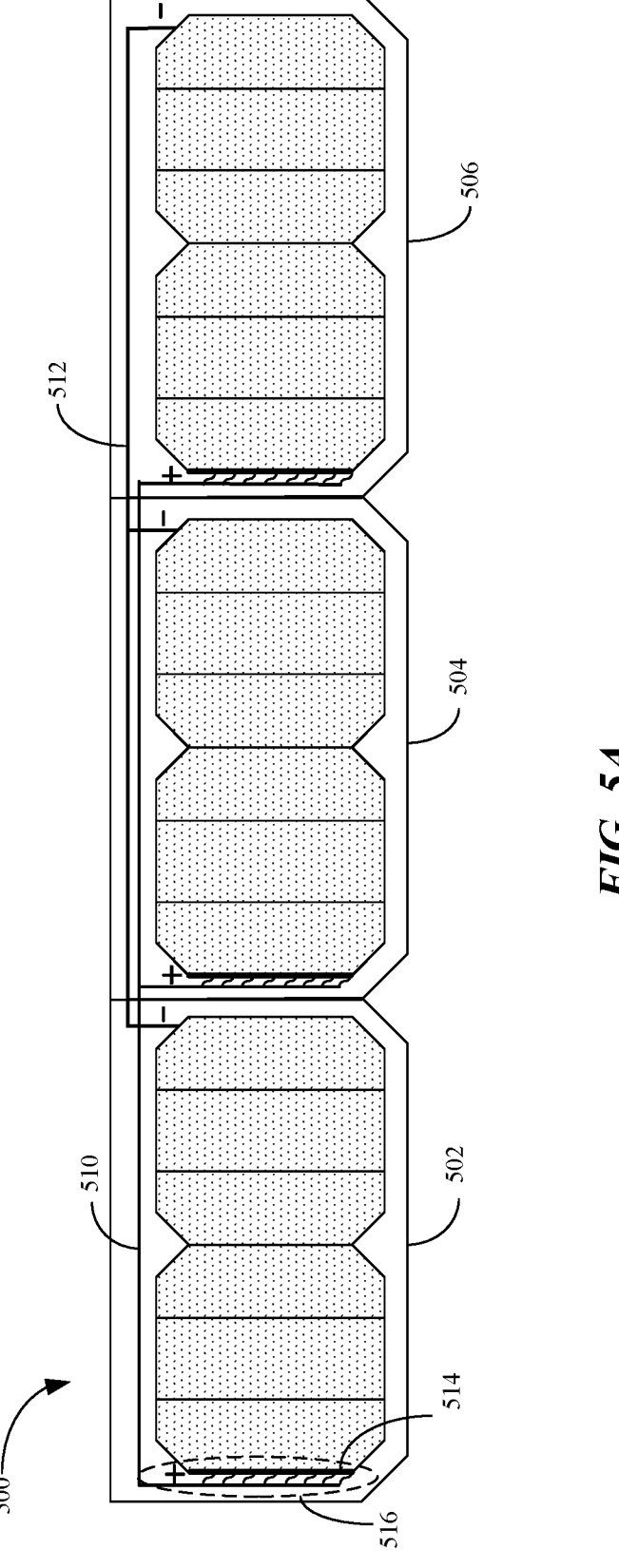
FIG. 5A shows a top view of an exemplary multi-tile module, according to one embodiment.

FIG. 5A shows a top view of an exemplary multi-tile module, according to one embodiment. Multi-tile module 600 can include PV roofing tiles 502, 504, and 506 arranged side by side. Each PV roof tile can include six cascaded strips encapsulated between the front and back covers, meaning that busbars located at opposite edges of the cascaded string of strips have opposite polarities. For example, if the leftmost edge busbar of the strips in PV roof tile 502 has a positive polarity, then the rightmost edge busbar of the strips will have a negative polarity. Serial connections can be established among the tiles by electrically coupling busbars having opposite polarities, whereas parallel connections can be established among the tiles by electrically coupling busbars having the same polarity.

Figure 6:
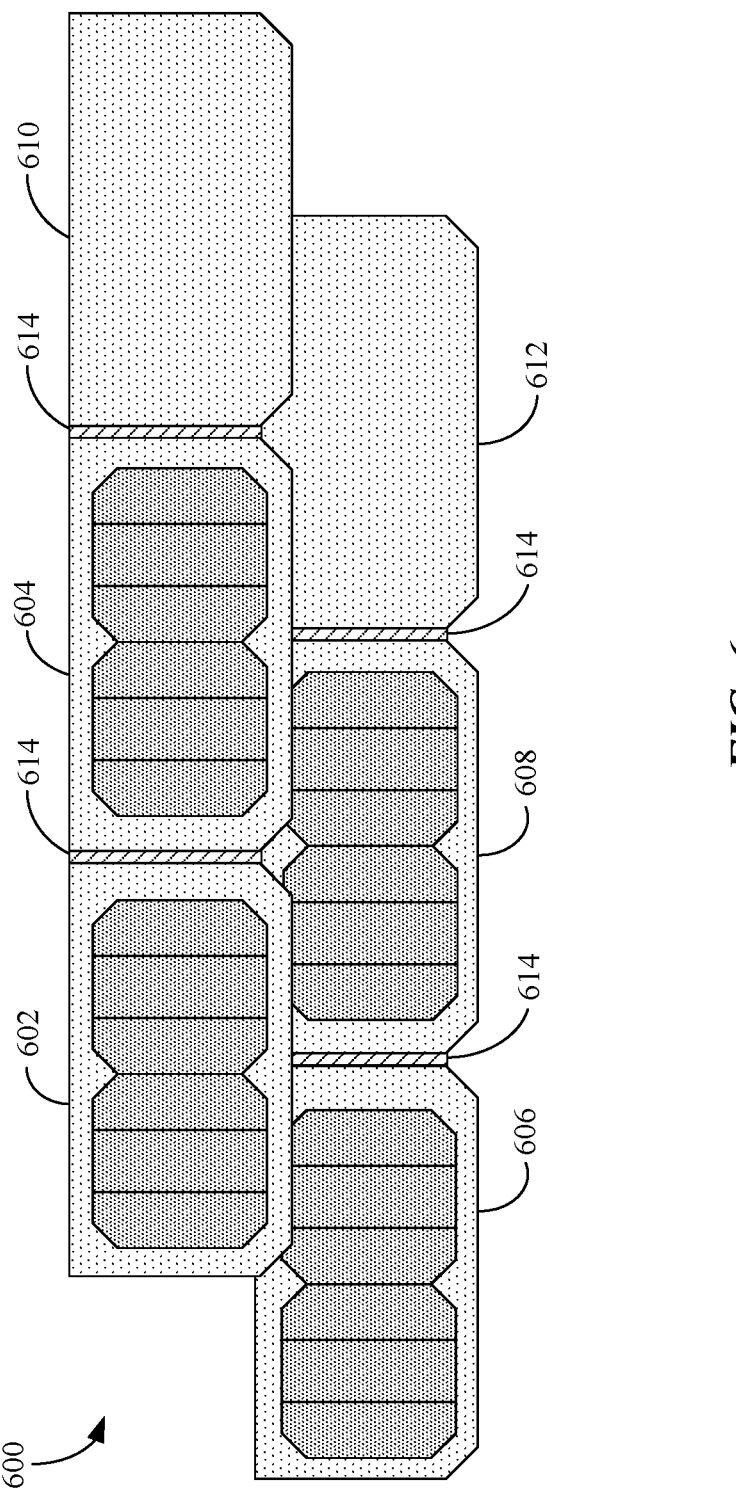
FIG. 6 shows a partial view of a roof having a number of solar roofing tiles and passive roofing tiles.

In the example shown in FIG. 5A, the PV roofing tiles are arranged in such a way that their sun-facing sides have the same electrical polarity. As a result, the edge busbars of the same polarity will be on the same left or right edge. For example, the leftmost edge busbar of all PV roofing tiles can have a positive polarity and the rightmost edge busbar of all PV roofing tiles can have a negative polarity, or vice versa. In FIG. 6, the left edge busbars of all strips have a positive polarity (indicated by the "+" signs) and are located on the sun-facing (or front) surface of the strips, whereas the right edge busbars of all strips have a negative polarity (indicated by the "−" signs) and are located on the back surface. Depending on the design of the layer structure of the solar cell, the polarity and location of the edge busbars can be different from those in FIG. 5A.

A parallel connection among the tiles can be formed by electrically coupling all leftmost busbars together via metal tab 510 and all rightmost busbars together via metal tab 512. Metal tabs 510 and 512 are also known as connection buses and typically can be used for interconnecting individual solar cells or strings. A metal tab can be stamped, cut, or otherwise formed from conductive material, such as copper. Copper is a highly conductive and relatively low-cost connector material. However, other conductive materials such as silver, gold, or aluminum can be used. In particular, silver or gold can be used as a coating material to prevent oxidation of copper or aluminum. In some embodiments, alloys that have been heat-treated to have super-elastic properties can be used for all or part of the metal tab. Suitable alloys may include, for example, copper-zinc-aluminum (CuZnAl), copper-aluminum-nickel (CuAlNi), or copper-aluminum-beryllium (CuAlBe). In addition, the material of the metal tabs disclosed herein can be manipulated in whole or in part to alter mechanical properties. For example, all or part of metal tabs 510 and 512 can be forged (e.g., to increase strength), annealed (e.g., to increase ductility), and/or tempered (e.g. to increase surface hardness).

The coupling between a metal tab and a busbar can be facilitated by a specially designed strain-relief connector. In FIG. 5A, strain-relief connector 516 can be used to couple busbar 514 and metal tab 510. Such strain-relief connectors are needed due to the mismatch of the thermal expansion coefficients between metal (e.g., Cu) and silicon. As shown in FIG. 5A, the metal tabs (e.g., tabs 510 and 512) may cross paths with strain-relief connectors of opposite polarities. To prevent an electrical short of the PV strips, portions of the metal tabs and/or strain-relief connectors can be coated with an insulation film or wrapped with a sheet of insulation material.

Figure 5B:
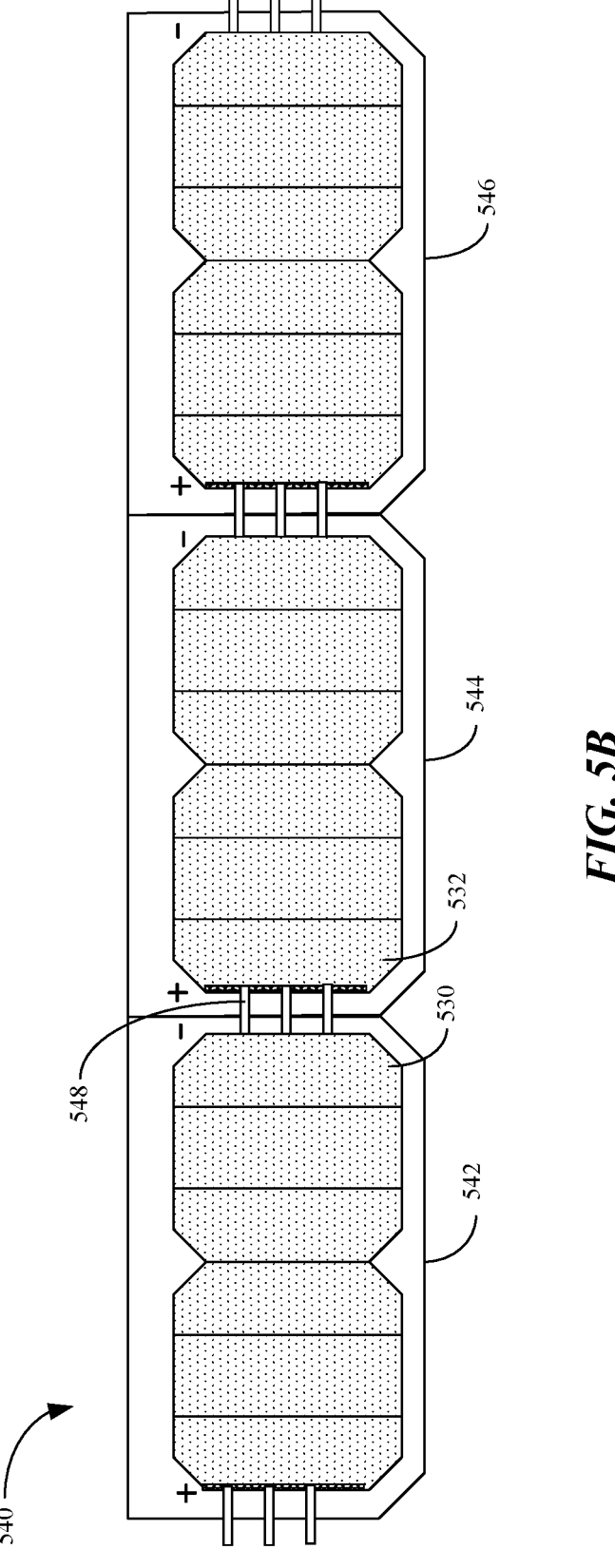
FIG. 5B shows a top view of another exemplary solar roofing tile, according to one embodiment.

In some embodiments, instead of parallelly coupling the tiles within a tile module using stamped metal tabs and strain-relief connectors as shown in FIG. 5A, one can also form serial coupling among the tiles. FIG. 5B shows the top view of an exemplary multi-tile module, according to one embodiment. Tile module 540 can include solar roofing tiles 542, 544, and 546. Each tile can include a number (e.g., six) of cascaded solar cell strips arranged in a manner shown in FIGS. 4A and 4B. Furthermore, metal tabs can be used to interconnect PV strips enclosed in adjacent tiles. For example, metal tab 648 can connect the front of strip 632 with the back of strip 630, creating a serial coupling between strips 630 and 632. Although the example in FIG. 5B shows three metal tabs interconnecting the PV strips, other numbers of metal tabs can also be used. Furthermore, each solar roof tile can contain fewer or more cascaded strips, which can be of various shapes and sizes.

For simplicity of illustration, FIGS. 5A and 5B do not show the inter-tile spacers that provide support and facilitate mechanical and electrical coupling between adjacent tiles. Detailed descriptions of such inter-tile spacers can be found in U.S. Patent Publication US20190260328A1, entitled "INTER-TILE SUPPORT FOR SOLAR ROOF TILES," the disclosure of which is incorporated herein by reference in its entirety.

Color Matching in Solar Roofing Tiles

As shown in FIG. 4C, FIG. 5A, and FIG. 5B, the PV structures and external electrodes encapsulated between the front and back covers can appear different than the background when viewed from the side of the transparent and colorless front cover. More specifically, the Si-based PV structures often appear to have a blue/purple hue. Although applying color onto the back cover can improve the color matching between the PV structures and the background, they cannot solve the problem of angle-dependence of color. In other words, the PV structures may appear to have different colors at different viewing angles, making color-matching difficult. Moreover, apart from solar roofing tiles, a roof can sometimes include a certain number of "passive" or "dead" roofing tiles, i.e., roofing tiles that do not have embedded solar cells. These passive roofing tiles can merely include the front and back covers and encapsulant sandwiched between the covers. The difference in appearance between the solar roofing tiles and the passive roofing tiles often results in a less pleasing aesthetic.

FIG. 6 shows a partial view of a roof having a number of solar roofing tiles and passive roofing tiles. In FIG. 6, roof 600 can include a number of roofing tiles arranged in such a fashion that the lower edges of tiles in a top row overlap the upper edges of tiles in a bottom row, thus preventing water leakage. Moreover, the tiles are offset in such a manner that the gap between adjacent tiles in one row somewhat aligns with the center of a tile located in a different row. In the example shown in FIG. 6, tiles 602, 604, 606, and 608 are solar roofing tiles, which can include PV structures encapsulated between front and back covers, and tiles 610 and 612 are passive roofing tiles. As one can see from the drawing, the color contrast between the back covers and the PV structures can create a "picture frame" appearance of the solar roofing tiles. In fact, the PV structures often appear to be "floating" above the colored back covers. Ideally, solar roofing tiles 602-608 should have a similar appearance as passive roofing tiles 610 and 612. Spacers 614 can fill gaps between adjacent tiles and prevent the passage of water between PV tiles 602-608. In some embodiments, spacers 614 can include electrical conductors that accommodate the passage of electricity and/or signals between adjacent PV tiles. In some embodiments, spacers 614 can define channels through which wires or similar conductors can carry the electricity and/or signals between the adjacent PV tiles.

PV Roofing Tile Feet

Figure 7A:
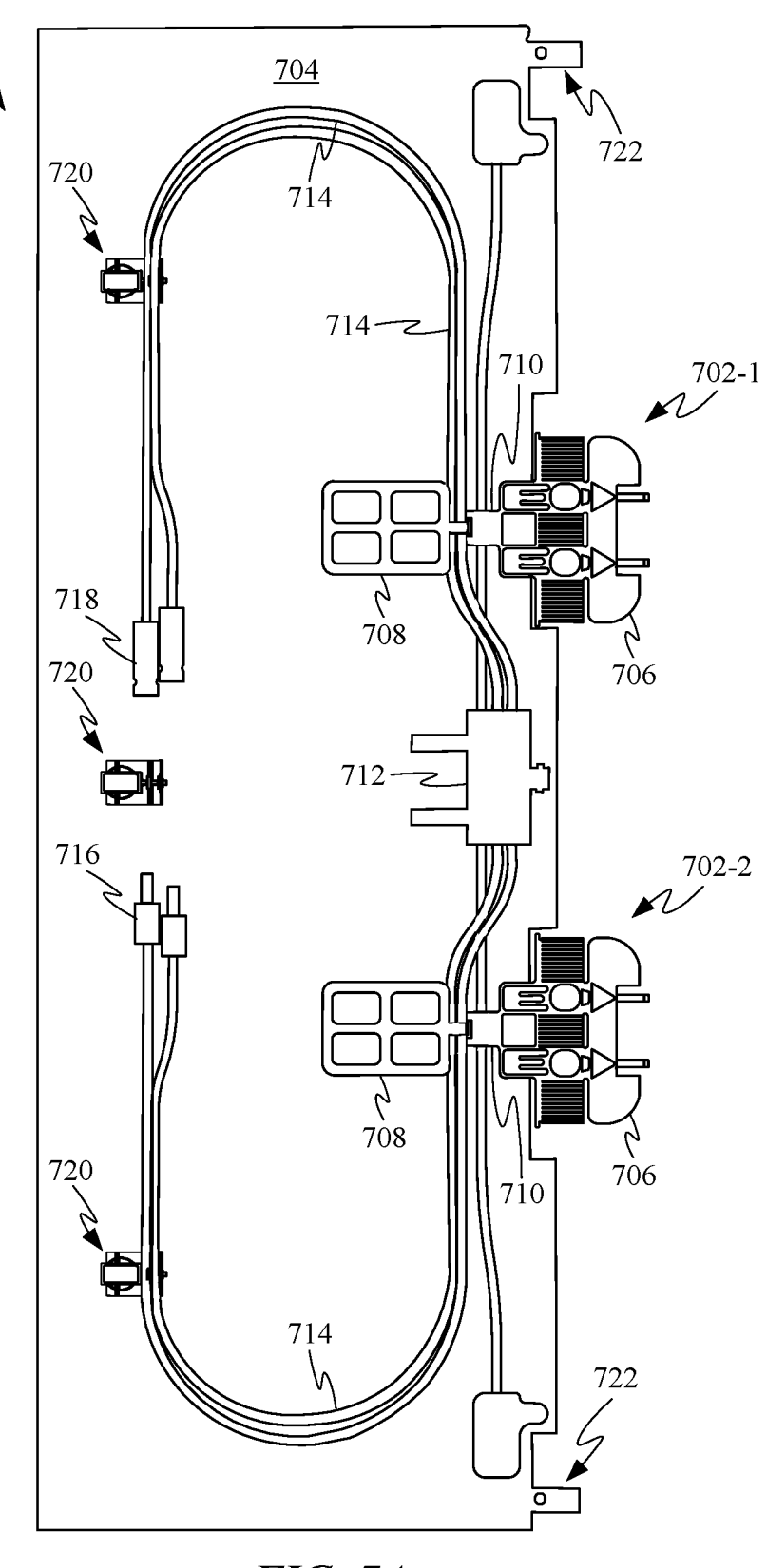
FIG. 7A shows a plan view of a roof substrate facing surface of a PV roofing tile.

FIG. 7A shows a plan view of a downward facing surface of a PV roofing tile 700. Multiple feet 702 are shown attached to PV tile backer 704. Each foot 702 includes a coupling assembly 706 and a standoff 708 coupled together by neck portion 710. In some embodiments, foot 702 can take the form of an injection molded polymeric part capable of supporting in conjunction with other feet 702 a weight of PV roofing tile 700 atop a roofing substrate. Foot 702 can be configured to support additional weight applied to PV roofing tile 700 from people walking atop PV roofing tile 700 or from The roofing substrate is generally formed from plywood and one or more layers of underlayment that helps improve an overall water resistance of the roof in the event any moisture getting through an array of roofing tiles positioned atop the roofing substrate.

Standoff 708 is also configured to lift PV tile backer 704 high enough above the roofing substrate to create a gap between the roofing substrate and the PV tile backer large enough to accommodate the attachment of a plurality of electrical components to the downward facing surface of PV tile backer 704. In particular, junction box 712 is shown positioned between foot 702-1 and foot 702-2. Junction box 712 is configured to accommodate the passage of cables 714 through one or more openings in PV tile backer 704. While cables 714 are shown affixed in place to PV tile backer 704, it should be appreciated that during installation, cables 714 include male connectors 716 and female connectors 718 that can be used to electrically couple adjacent PV roofing tiles together, thereby allowing energy generated by the PV roofing tiles to be gathered and then output for use by the residence or the power grid to which they are attached. Solar roofing solutions typically also include an inverter that is configured to convert the DC power generated by the PV roofing tiles into AC power ready for use by a residence or power grid.

Also attached to PV tile backer 704 are tile hooks 720. Tile hooks 720 are arranged near a down-roof facing end of PV tile backer 704 and configured to engage retaining features of a coupling assembly positioned on a PV roofing tile down roof from PV roofing tile 700. Tile hooks 720 also include one or more wire retaining features that help secure cables 714 to the downward facing surface of PV tile backer 704 when PV roofing tile 700 is being transported to a job site. Finally PV tile backer 704 also includes a number of protrusions 722 extending laterally from an up-roof facing edge of PV tile backer 704. Protrusions 722 can be used to attach additional feet to PV roofing tile 700, which are used to join adjacent PV roofing tile together. These feet that also function to connect adjacent roofing tiles are depicted in FIG. 7F and described in greater detail in the text describing FIG. 7F. Additional protrusions 722, which are obscured by the presence of foot 702-1 and foot 702-2, are also part of PV tile backer 704 and used to help attach coupling assemblies 706 of feet 702 to PV tile backer 704.

Figures 7B, 7C:
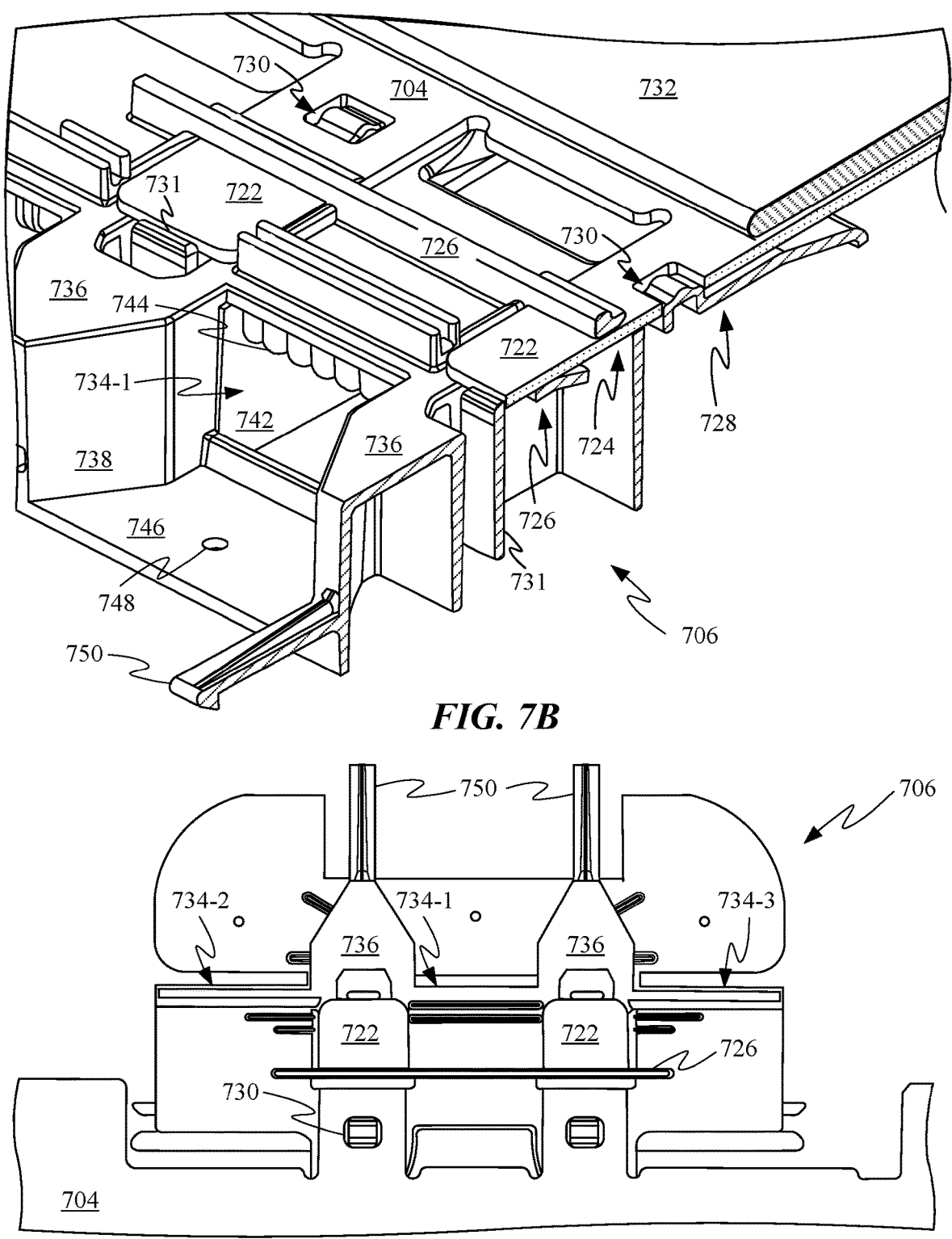
FIGS. 7B-7C show close-up views of a PV roofing tile foot.

FIG. 7B shows a upper perspective view of coupling assembly 706 that includes a partial cross-sectional view illustrating how one of protrusions 722 engages a slot 724 defined by coupling assembly 706. In particular, protrusion 722 is retained within slot 724 by cantilevered beams 726 and 728 exerting upward moments on distal and proximal ends of protrusion 722. Upward movement of protrusion 722 is prevented by cross beam 726, which forms an upper surface of slot 724. As shown, cross beam 726 forms an upper surface for both slots 724 depicted in FIG. 7B. The depicted configuration allows coupling assembly 706 to be securely attached to PV tile backer 704, while also allowing for removal of foot 702 from PV tile backer 704. In particular, openings 730 in protrusions 722 allow a user to press on a distal end of cantilevered beam 728 to disengage the distal end of cantilevered beam 728 from opening 730 and thereby allow for the withdrawal of foot 702 from PV tile backer 704. Once protrusions 722 are securely seated within slots 724, further movement is prevent by cantilevered beams 728 engaged within openings 730 and by retaining tabs 731, which are positioned at a distal end of each of protrusions 722. While this attachment system offers the advantage of a removable foot 702, it should be appreciated that protrusions 722 could also be glued to a flat, upward facing surface of coupling assembly 706 or within a channel sized to receive protrusions 722. Foot 702 could also be secured to PV tile backer 704 solely by gluing standoff 708 (see FIG. 7A) directly to PV tile backer 704. In some embodiments, foot 702 can be attached to PV tile backer 704 by the cantilevered configuration depicted in FIG. 7B and also by using glue to adhere standoff 708 to PV tile backer 704.

FIG. 7B also shows a protective cover 732 of PV roofing tile 700 and how it does not extend to cover protrusions 722, which extend laterally from an edge of PV tile backer 704 configured to be oriented in an up-roof direction. FIG. 7B also clearly depicts a central retaining feature 734 of a plurality of retaining features defined by coupling assembly 706. In particular, an entrance into retaining feature 734 is defined by triangular alignment features 736 that include chamfered surfaces that are configured to guide one of tile hooks 720 into retaining feature 734. While the depicted configuration show triangular alignment features 736 including chamfered (i.e. flat/angled) surfaces 738 for guiding, it should be appreciated that chamfered surface 738 can also be modified to be a curved surface (e.g. convex or concave) that can also help to align tile hook 720 with and facilitate entry of tile hook 720 into retaining feature 734. Coupling assembly 706 is also configured to accommodate efficient removal of the tile it is coupled to. For example, when a PV roofing tile requires removal or maintenance it can be pushed up-roof until its hook disengages from the respective coupling assembly and then lifted up and slid down-roof and out of position once its wiring is disconnected.

FIG. 7B shows how retaining feature 734 takes the form of an aperture defined by lateral walls 742 for establishing a horizontal position of a tile hook 720 received within retaining feature 734 and an upper wall 744 for engaging a hook portion of tile hook 720. While upper wall 744 is depicted with a ribbed surface. It should be appreciated that a flat upper wall could also be used to achieve similar results. Retaining features adjacent to retaining feature 734 can also include upper walls with ribbed or flat surfaces. In some embodiments, a ribbed surface can reduce an amount of friction when trying to seat a tile hook within one of the retaining features.

Coupling assembly 706 also includes a base 746 that is configured to contact and rest against a roofing substrate. In some embodiments, base 746 includes one or more fastener openings 748 allowing base 746 of coupling assembly 706 to be coupled to the roofing substrate using a fastener taking the form of, e.g., a nail or screw. Coupling assembly also includes cable guides 750 that are configured to prevent any cables being routed in front of coupling assembly 706 from interfering with a tile hook 720 entering one of the retaining features 734 defined by coupling assembly 706. Retaining features 734 can all take the form of fully defined apertures to allow for a hook 720 to engage any of retaining features 734. Alternatively, outboard retaining features 734-2 and 734-3 can lack an outboard wall allowing retaining features 734-2 and 734-3 to be engaged by u-shaped brackets of a non-PV roofing tile as will be demonstrated in greater detail below.

FIG. 7C shows a top down view of coupling assembly 706 and illustrates more clearly the shape of triangular alignment features 736. While FIG. 7C clearly shows the configuration including only three adjacent retaining features 734, it should be appreciated that a widened coupling assembly 706 is also possible. For example, the widened coupling assembly could support four, five, six or seven adjacent retaining features 734 with additional triangular alignment features separating adjacent ones of the retaining features 734. A wider coupling assembly 706 could be engaged by a larger number of parallel protrusions 722. For example, coupling assembly 706 could include a slot corresponding to each triangular alignment feature.

Figure 7D:
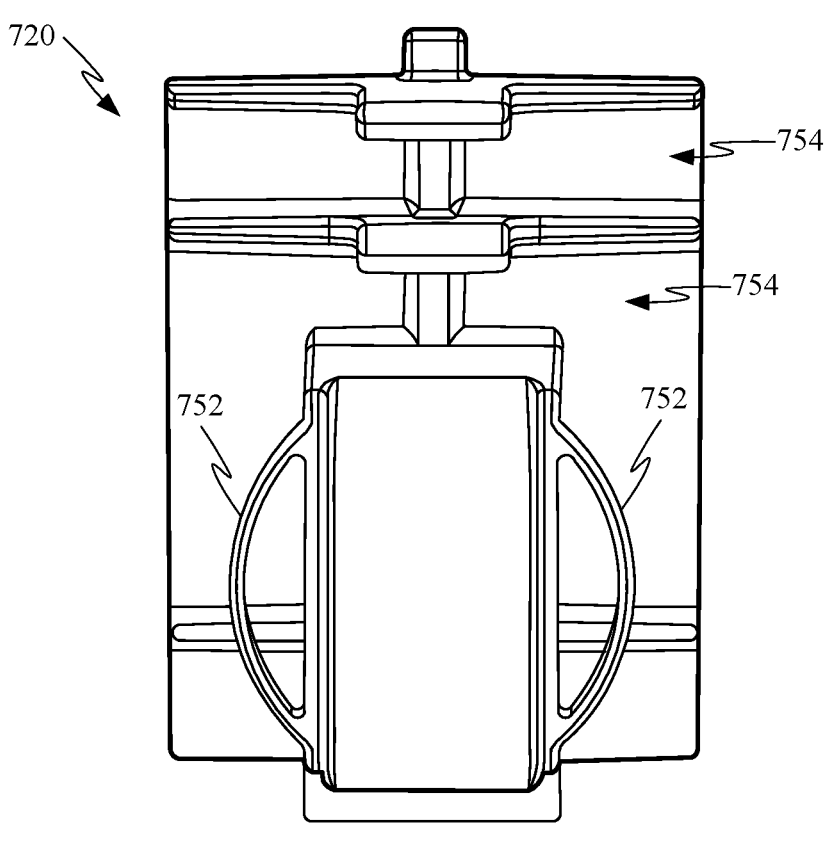
FIGS. 7D-7E show different views of a PV rook.
Figure 7E:
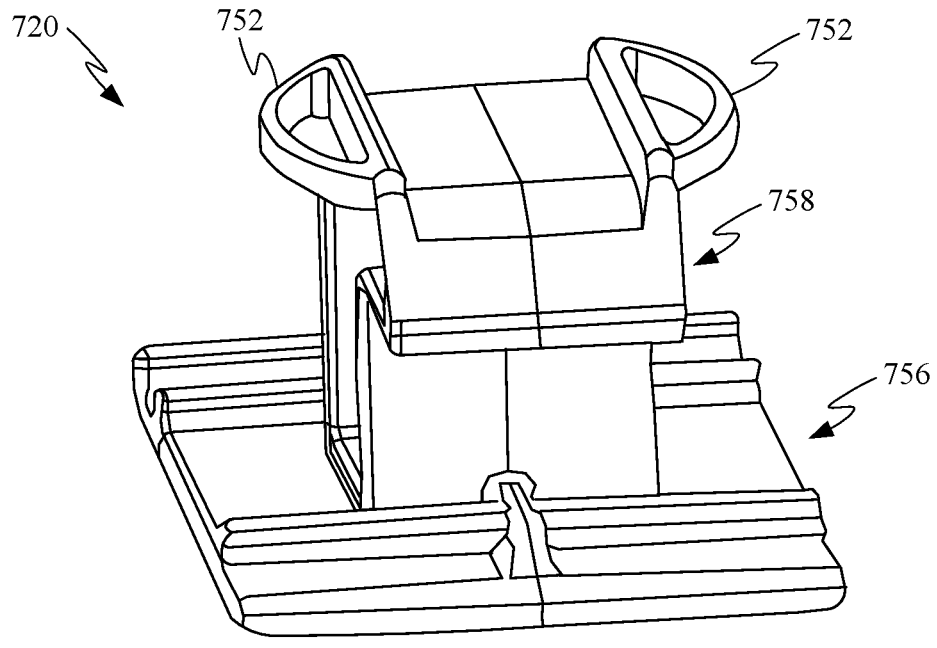
Figure 7F:
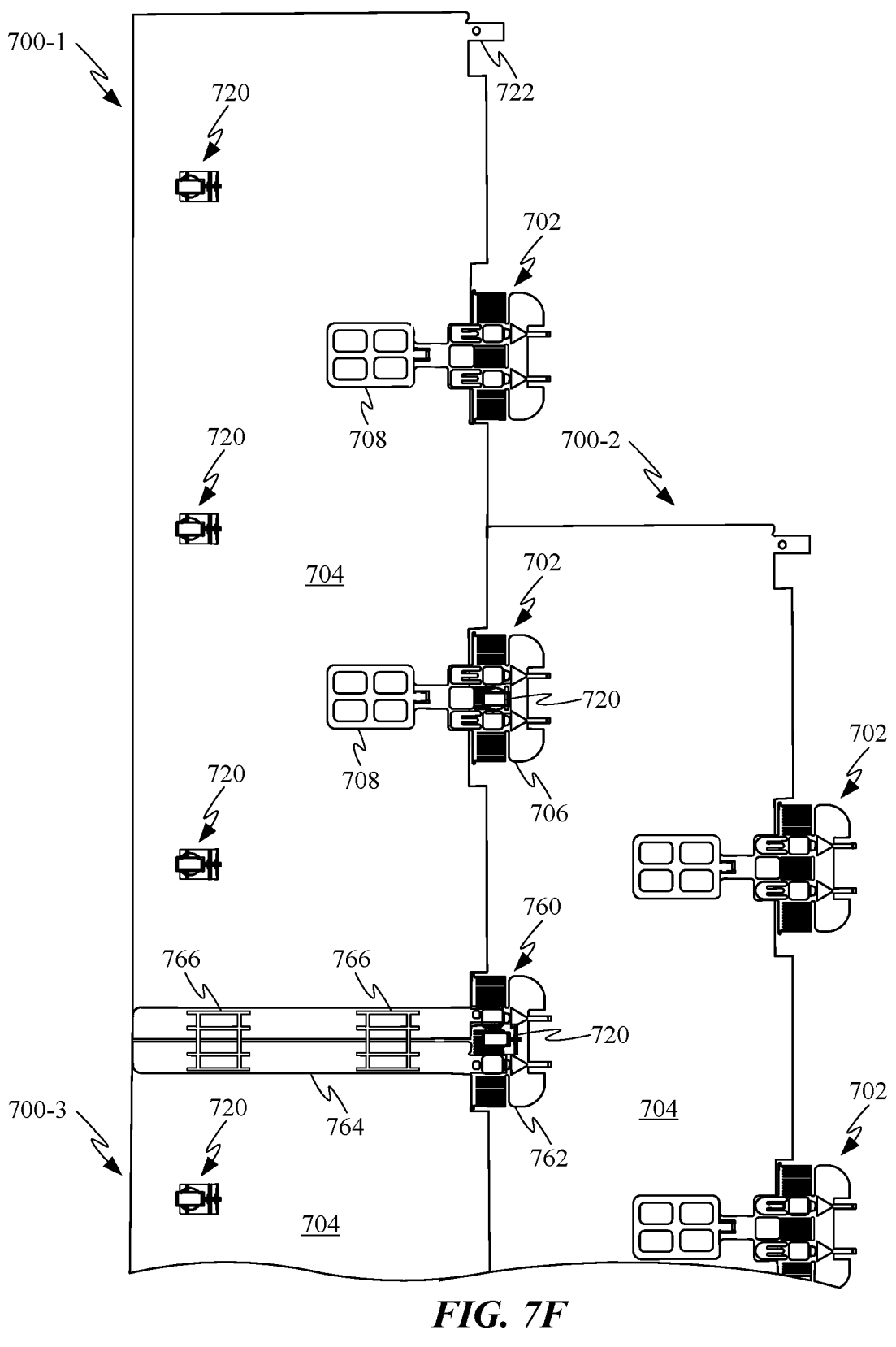
FIG. 7F shows a plan view of multiple PV roofing tiles coupled together.

FIGS. 7D-7E show top down and perspective views of tile hook 720. In particular, tile hook 720 includes deflectable wings 752 that are configured to deflect when lodged between lateral walls 742 of retaining feature 734-1. Deflection of deflectable wings 752 help to center the hook within retaining feature 734-1. A slight compression of deflectable wings 752 can also help to establish a robust interference fit within retaining feature 734-1. Tile hook 720 further includes multiple wire retaining channels 754 located on a base portion 756 of tile hook 720 for retaining electrical cabling during transit of PV roofing tile 700. While deflectable wings 752 are shown as being integrally formed at a distal end of a hook portion 756 of tile hook 720, deflectable wings 752 can alternatively be formed from an elastomeric material that is different from the material used to form the rest of hook portion 758. For example, rubber bumpers could be positioned along opposing sides of hook portion 758 in order to allow for compression of the rubber bumpers while the rest of tile hook 720 remains rigid in order to prevent tile hook 720 from deforming and becoming dislodged. It should also be appreciated that deflectable wings 752 could also have a linear geometry, where instead of having both ends of the wings attached to hook portion 758 as shown in FIGS. 7D and 7E only a first end of each deflectable wing 752 could be attached and the wing could extend linearly at between 15 and 45 degrees to help center hook portion 758 within a retaining feature 734-1.

FIG. 7F shows a plan view of downward facing surfaces of PV roofing tiles 700-1 and 700-2 along with a portion of PV roofing tile 700-3 in which all three tiles are coupled together. Of particular interest, FIG. 7F shows how tile hooks 720 of PV roofing tile 700-2 are engaged with retaining features of coupling assemblies 706 to couple PV roofing tile 700-2 to PV roofing tiles 700-1. FIG. 7F also depicts foot 760, which includes a coupling assembly 762 that couples to protrusions 722 of roofing tiles 700-1 and 700-3. Foot 760 is different than feet 702 because instead of a unitary standoff, foot 760 includes a support structure 764 that extends across an interface between PV roofing tiles 700-1 and 700-3. Support structure 764 is configured to catch any water passing through a gap between PV roofing tiles 700-1 and 700-3 and guide the water in a down-roof direction thereby stopping the water from reaching a roofing substrate below PV roofing tiles 700. Support structure 764 can define one or more channels that guide the water caught by support structure 764. The channels are configured to release the water over a sun-facing surface of a roofing tile positioned down-roof of foot 760. In addition to catching and guiding water passing between PV roofing tiles 700-1 and 700-3, support structure 764 also includes one or more standoffs 766 that provide structural support to the edges of PV roofing tiles 700-1 and 700-3. Incorporating multiple standoffs 766 allows for a more even distribution of any forces received by foot 760. It should be appreciated that foot 760 could also include a single standoff 766 or an elongated standoff 766 in order to achieve a more even distribution of force. It should be noted that FIG. 7F also shows an offset between roofing tile 700-1 and roofing tile 700-2 of a half tile. This offset, as depicted, allows hooks 720 of PV roofing tile 700-2 to engage coupling assemblies of a first foot 702 of PV roofing tile 700-1, a foot 760 and a second foot 702 of PV roofing tile 700-3, thereby securely interlocking the three PV roofing tiles together. It should be noted that other offset amounts are possible considered to be a configuration option depending on the desired roofing configuration. However the configuration shown in FIG. 7F is preferred due to the robust mechanical interlock established between the roofing tiles.

Figures 7G, 7H:
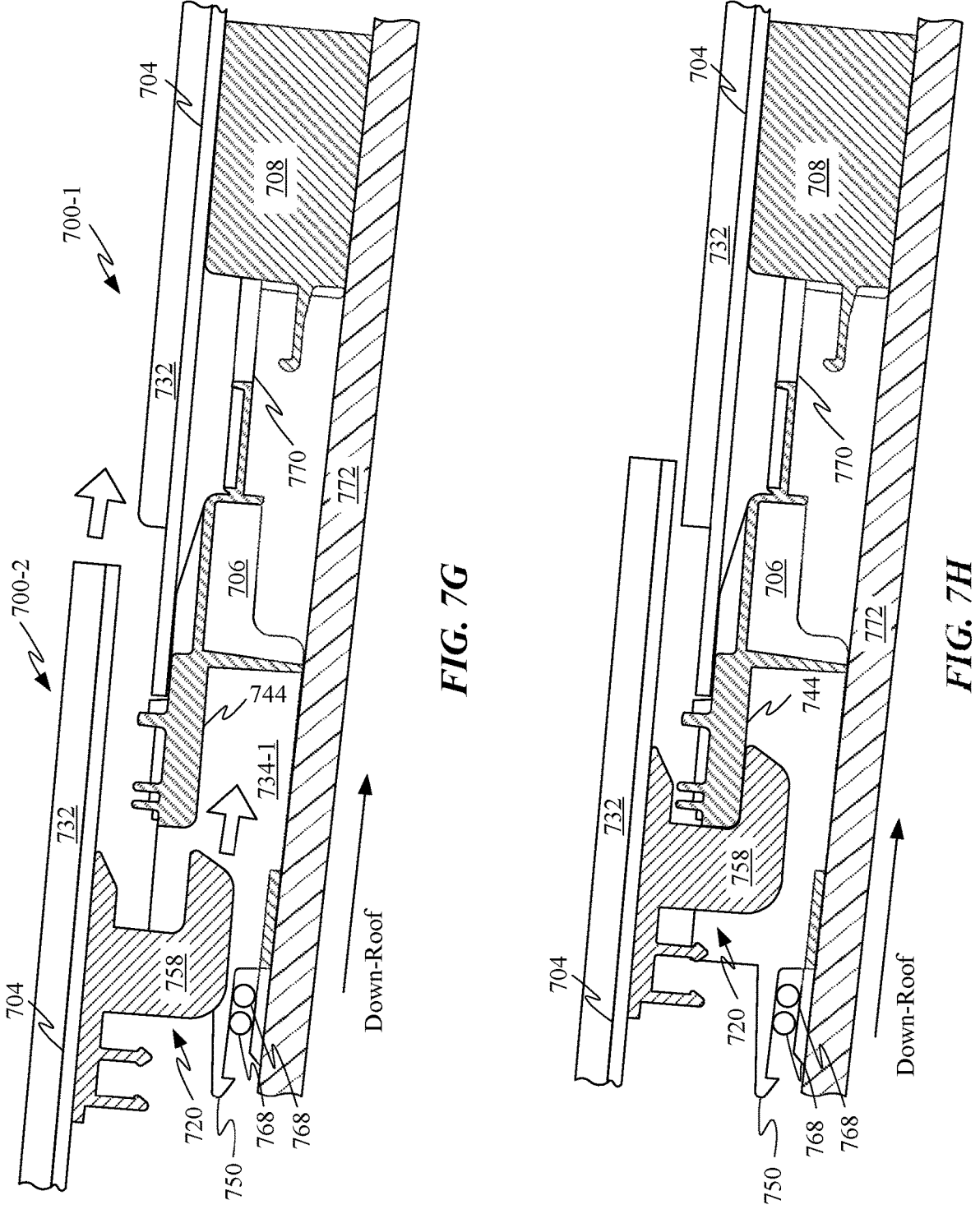
FIGS. 7G-7H show how a hook portion of a tile hook slides into a retaining feature of a coupling assembly of a foot of a PV roofing tile.

FIGS. 7G-7H show how hook portion 758 of tile hook 720 slides into retaining feature 734-1 of coupling assembly 706. Cable guides 750 are shown preventing cables 768 from interfering with the engagement of hook portion 758 of tile hook 720 into retaining feature 734-1. Neck portion 768 of foot 702 is also shown connecting coupling assembly 706 to standoff 708. FIGS. 7G-7H also demonstrate how foot 702 positions PV roofing tiles 700 at an angle non-parallel to a surface of roofing substrate 772. This cants the angle of the PV roofing tiles up slightly which allows the forward edge of the PV roofing tile to overlap the tile positioned below it.

Figure 8A:
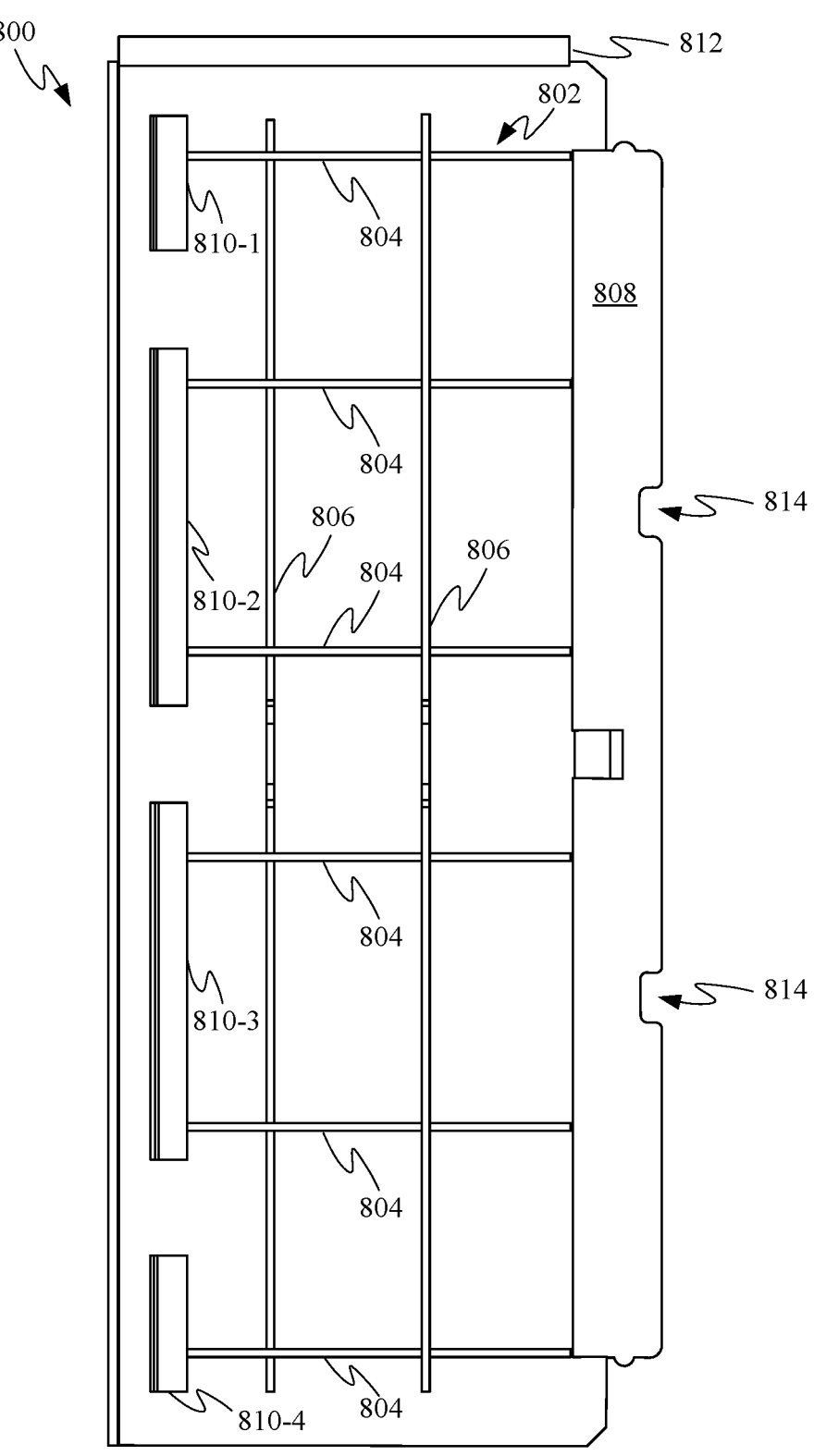
FIG. 8A shows a plan view of a downward facing surface of a non-PV roofing tile.

FIG. 8A shows a plan view of a downward facing surface of a non-PV roofing tile 800. Non-PV roofing tile 800 can be formed from sheet metal with a upward facing surface configured to match a look and style of PV roofing tiles it is positioned beside. The downward facing surface of non-PV roofing tile 800 can include a single standoff 802 formed from multiple interlocking vertical cross-members 804 and horizontal cross-members 806. Standoff 802 can be configured to lift non-PV roofing tile 800 a similar distance off of and a angle relative to the a roofing substrate as feet 702 of PV roofing tiles 700. While a single standoff 802 is used here it should be appreciated that standoff 802 could be replaced with multiple smaller standoffs distributed across the downward facing surface of non-PV roofing tile 800. Standoff 802 can be adhesively coupled to the downward facing surface of non-PV roofing 800. Cross-members 804 and 806 that form standoff 802 can be formed from a polymeric material, however, other materials such as ceramics and light weight metals can also be used to create all of or portions of standoff 802.

FIG. 8A also shows non-PV roofing tile 800 including a rear bracket 808 configured to engage one or more tile hooks on a PV roofing tile up-roof of non-PV roofing tile 800 or alternatively engage one or more front bracket segments on a non-PV roofing tile up-roof of non-PV roofing tile 800. Non-PV roofing tile 800 includes front bracket segments 810-1-810-4. Front bracket segments 810 are separated by a distance sized to allow the passage of a coupling assembly 706 of a foot 702 or 760 of a PV roofing tile 700. Non-PV roofing tile 800 also includes a water channel 812 that makes it unnecessary to equip non-PV roofing tile 800 with a discrete foot 760 configured to join non-PV roofing tile 800 to an adjacent roofing tile. In this way, water channel 812 can extend under a gap between adjacent non-PV roofing tiles. Water channel 812 can be formed by bending a protruding end of the sheet metal forming a majority of non-PV roofing tile 800 to form a channel configured to gather any water passing between adjacent non-PV roofing tiles. In some embodiments, a lower portion of rear bracket 808 configured to be secured to the roofing substrate can include notches 814 that assist with preventing damage to rear bracket 808. Notches 814 allow a packing team to thread packing straps over the notches, which reduces the amount of stress applied to rear bracket 808 when securing non-PV roofing tile 800 to a pallet for transit.

Figures 8B, 8C:
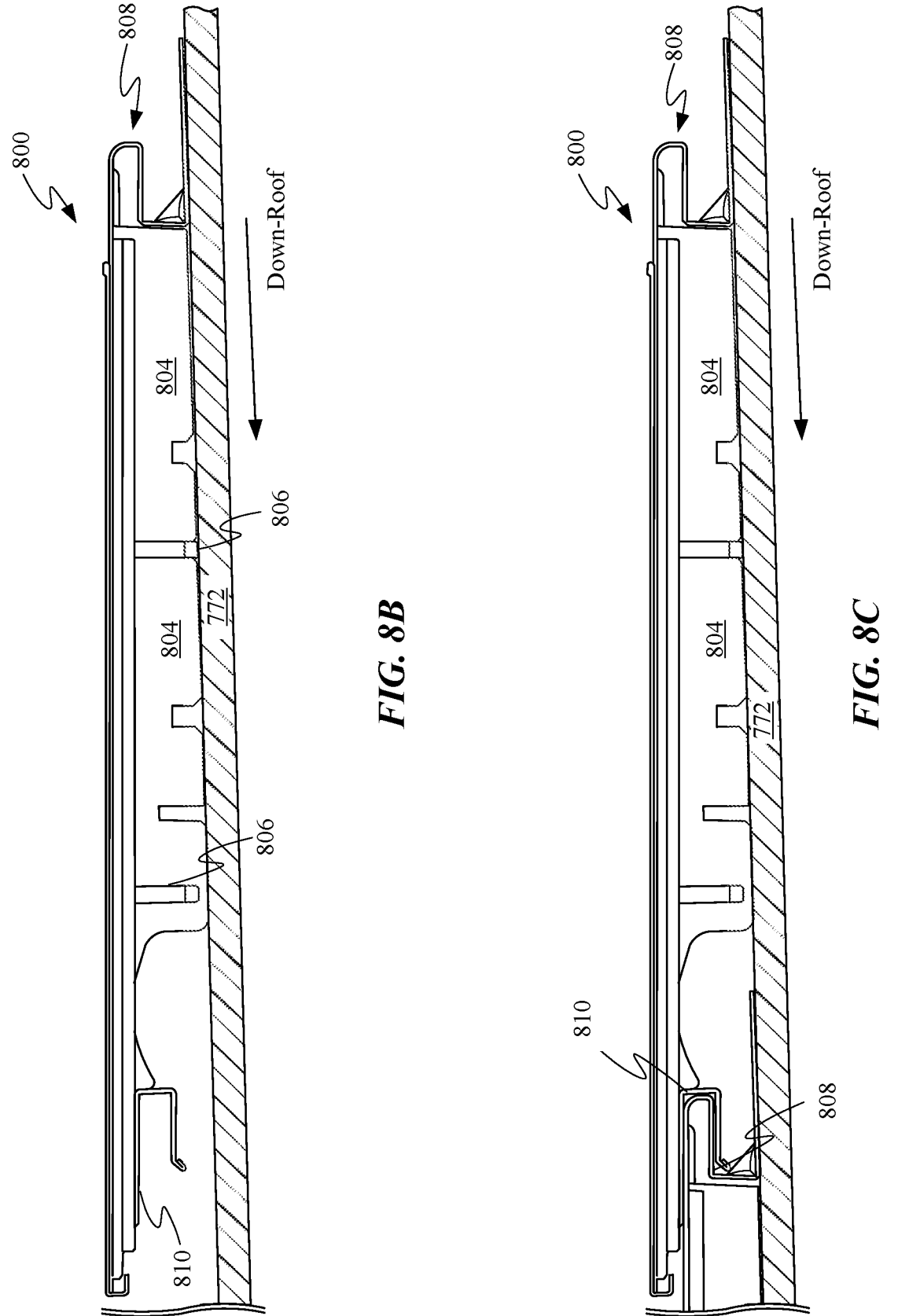
FIG. 8B shows a side view of a PV roofing tile mounted atop a roofing substrate.
FIG. 8C shows how a rear bracket of a down-roof non-PV roofing tile engages a front bracket segment of the non-PV roofing tile depicted in FIG. 8B.

FIG. 8B shows a side view of non-PV roofing tile 800 mounted atop roofing substrate 772. A shape of rear bracket 808 is shown illustrating how rear bracket 808 has a u-shaped geometry allowing it to capture one of tile hooks 720 and/or one or more of front bracket segments 810. In some embodiments rear bracket 808 can include one or more fastener openings that allow non-PV roofing tile 800 to be secured directly to roofing substrate 772. The side view provided by FIG. 8B also shows how vertical cross-members 804 and horizontal cross-members 806 can interconnect by engaging slots defined by each of the respective cross-members allowing each of the cross-members to extend across a majority of a width or height of non-PV roofing tile 800 as shown in FIG. 8A. FIG. 8B also demonstrates how vertical cross-members 804 can extend all the way from one of front bracket segments 810 to rear bracket 808. FIG. 8C shows how a rear bracket 808 of a down-roof non-PV roofing tile 800 engages a front bracket segment 810 of non-PV roofing tile 800, thereby preventing upward movement of a down-roof facing end of non-PV roofing tile 800 in the event of high winds or other natural phenomenon.

Figure 8D:
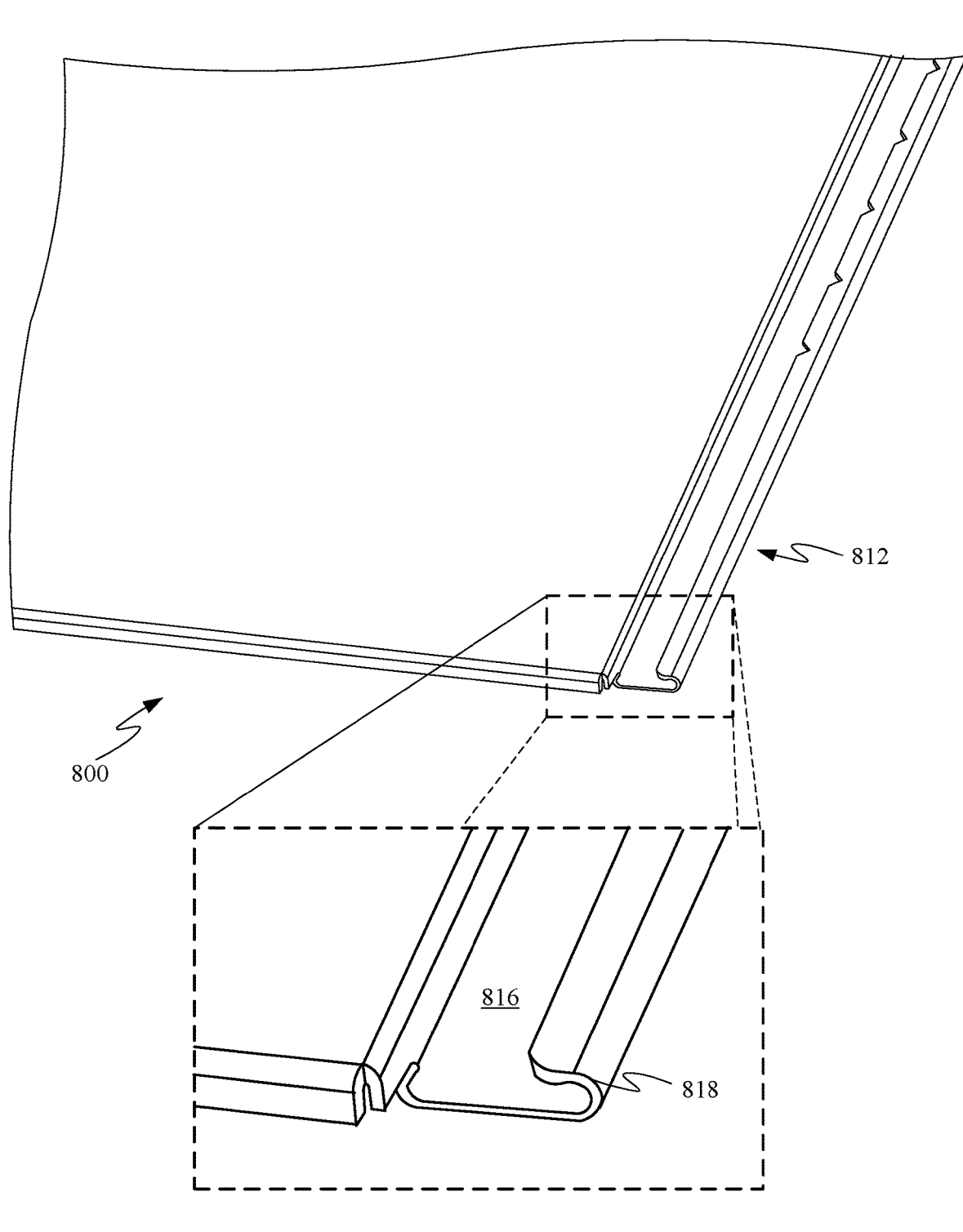
FIG. 8D shows a perspective view of an upper surface of a non-PV roofing tile with a close-up view of a water channel of the non-PV roofing tile.

FIG. 8D shows a perspective view of an upper surface of non-PV roofing tile 800 with a close up view of water channel 812. The close up view of water channel 812 shows how excess material at the edge of the sheet metal forming non-PV roofing tile 800 can be shaped to form a channel 816 configured to guide any rain or moisture passing between adjacent non-PV modules 800 from reaching the roofing substrate. Water channel 812 also includes a lip 818 configured to interlock with an adjacent non-PV roofing tile and prevent inadvertent lateral movement of a non-PV roofing tile during the installation process. It should be noted that when an opposite side of non-PV module 800 that does not include the water channel 812 abuts a PV roofing tile module 700, a foot 760 can be used to prevent the passage of rain between the roofing tiles.

Figure 9B:
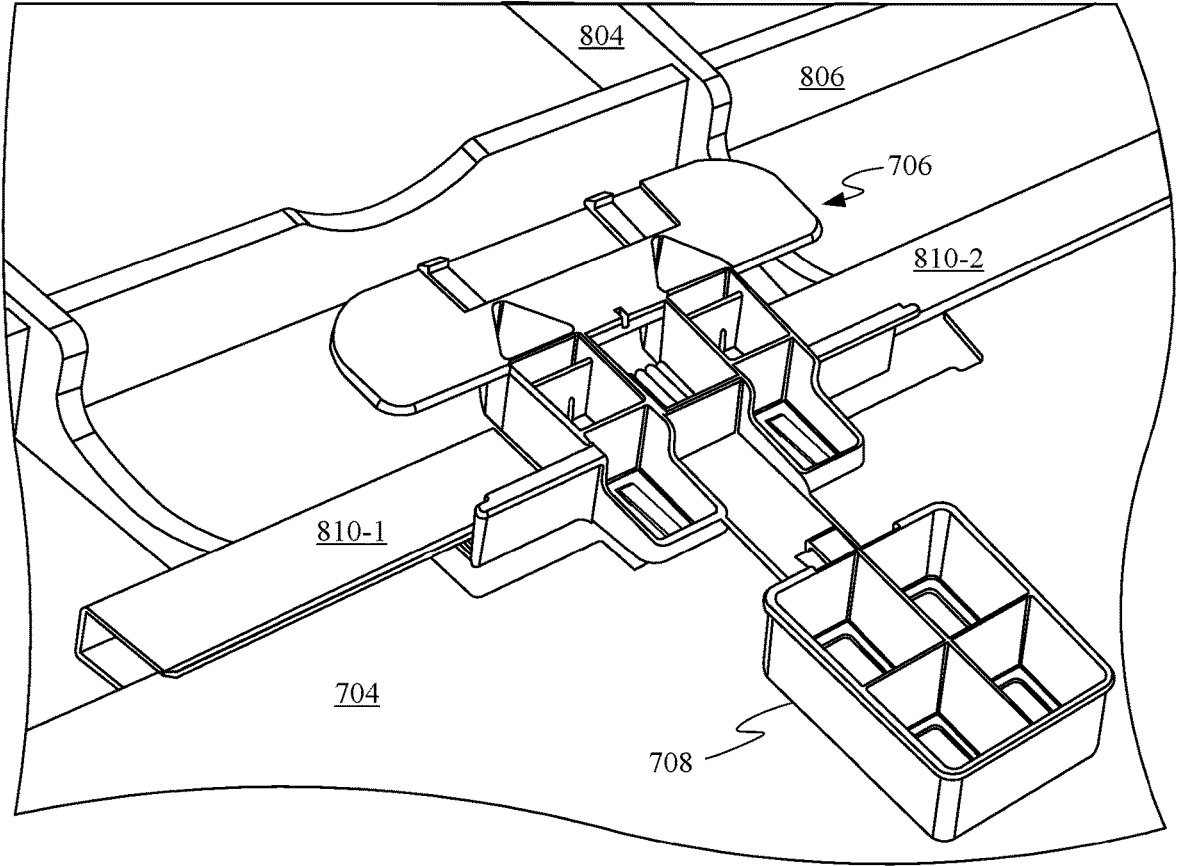
Figure 9C:
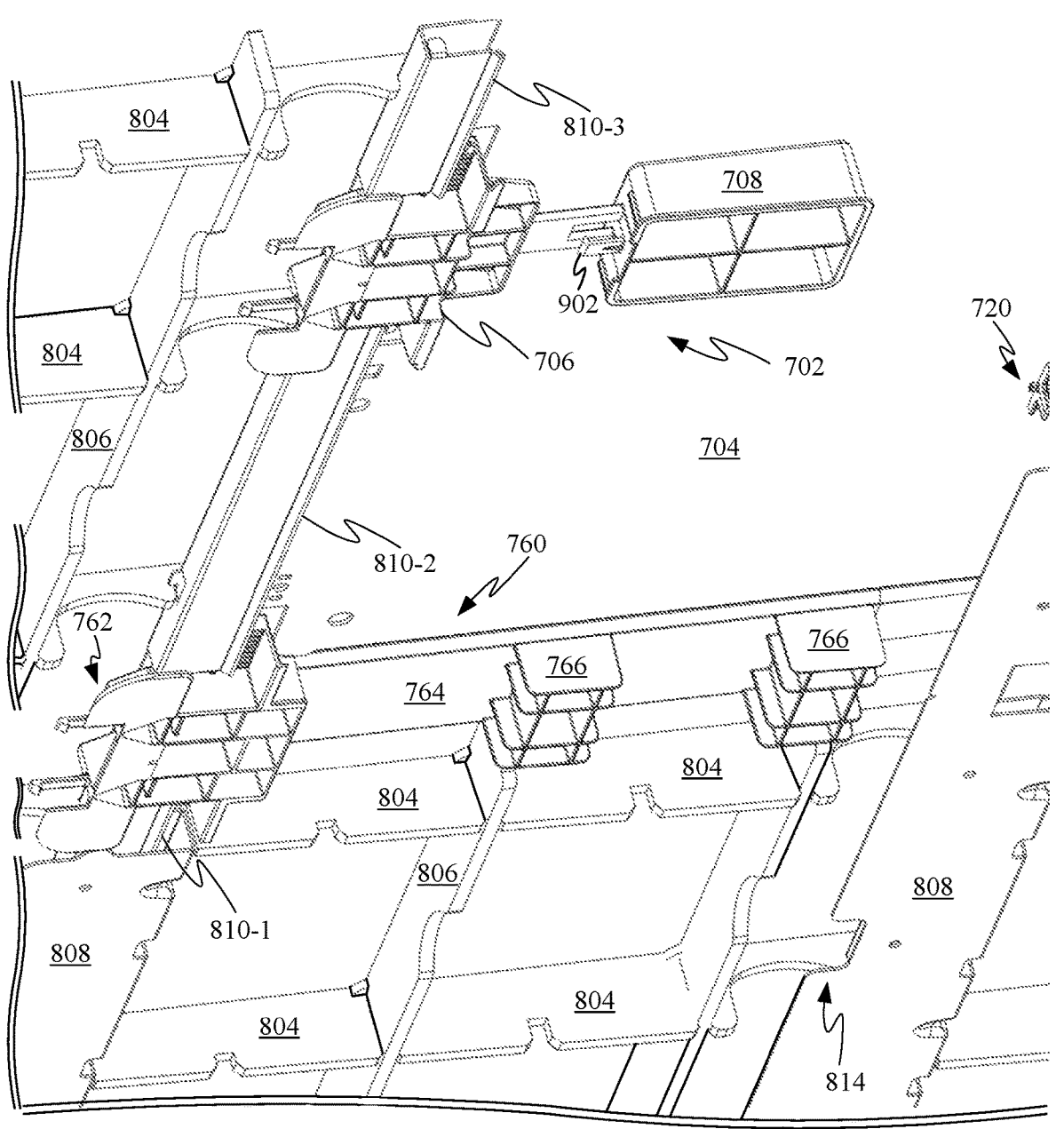

FIGS. 9A-9C show various views of coupling assemblies 706 of feet 702 of a PV roofing tile 700 coupled with front bracket segments 810 of a non-PV roofing tile 800. FIG. 9A shows a top down view of coupling assembly 706-1 extending through a gap between front bracket segments 810-3 and 810-4 such that portions of front bracket segments 810-3 and

810-4 are secured within retaining features 734 of coupling assembly 706-1. While not specifically depicted, it should be appreciated that a foot 760 attached to PV roofing tile 700 would extend through the gap between front bracket segments 810-1 and 810-2 to further secure a rear end of PV roofing tile 700 to a front end of non-PV roofing tile 800. FIG. 9B shows a close up perspective view of a foot 702 engaging front bracket segments 810-1 and 810-2.

FIG. 9C shows a perspective of an underside of a PV roofing tile positioned between multiple non-PV roofing tiles. A coupling assembly 706 of foot 702 is shown engaged within a gap between front bracket segments 810-2 and 810-3. FIG. 9C also shows a U-shaped geometry of front bracket 810-3. FIG. 9C also includes a foot 760 shows a perspective view of an exemplary foot 760. FIG. 9C shows differences between standoff 708 of foot 702 and standoffs 766 of foot 760. FIG. 9C also depicts a cable guide 902 of foot 702 that protrudes from standoff 708 and allows for keeping cables affixed to PV tile backer 704 during transit and in early phases of the installation of PV roofing tiles 700. FIG. 9C also demonstrates how front bracket segment 810-1 fits within rear bracket 808 of an up-roof non-PV roof tile.

Figure 10A:
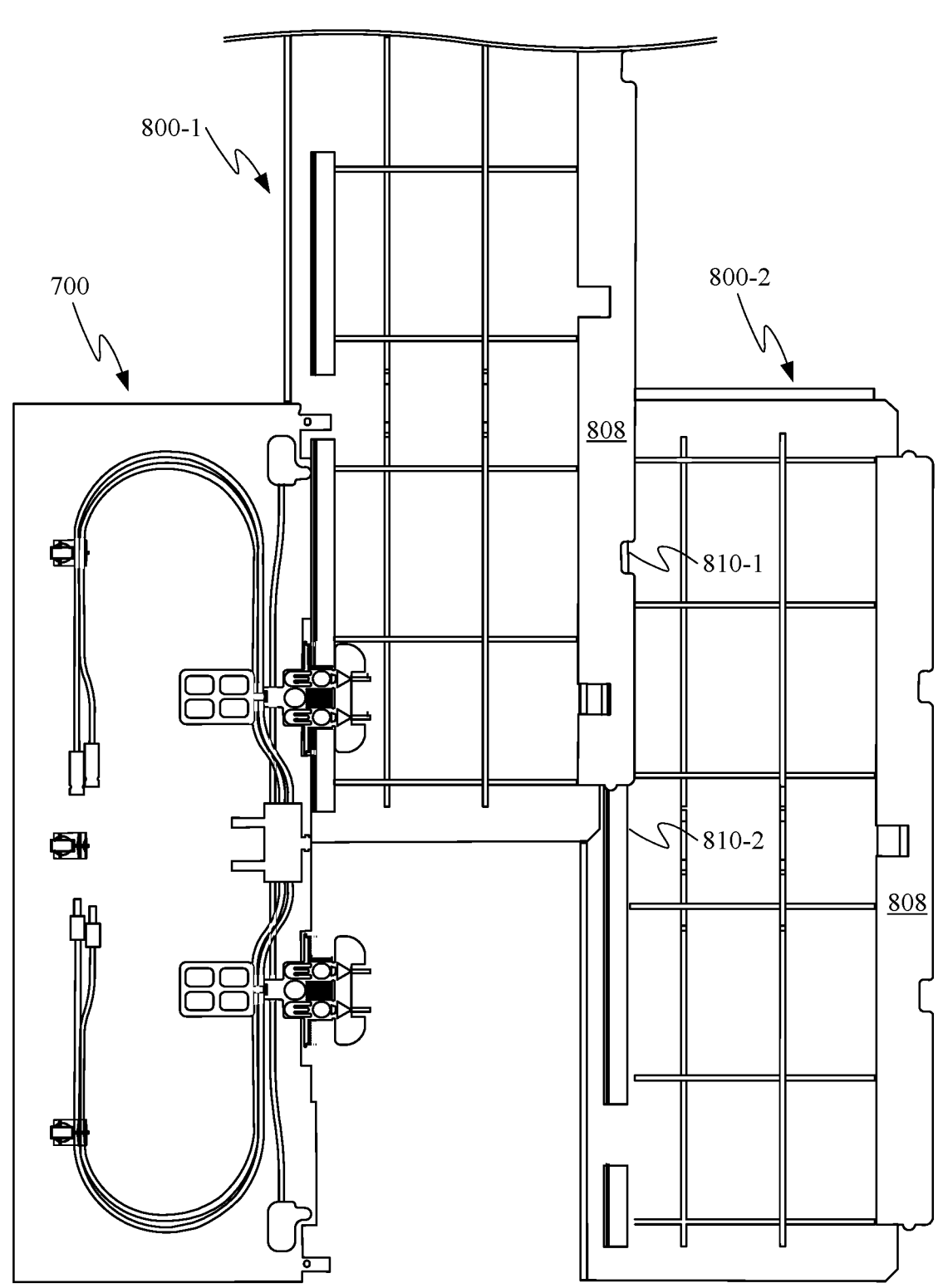
FIGS. 10A-10B show different combinations of PV and non-PV roofing tiles.
Figure 10B:
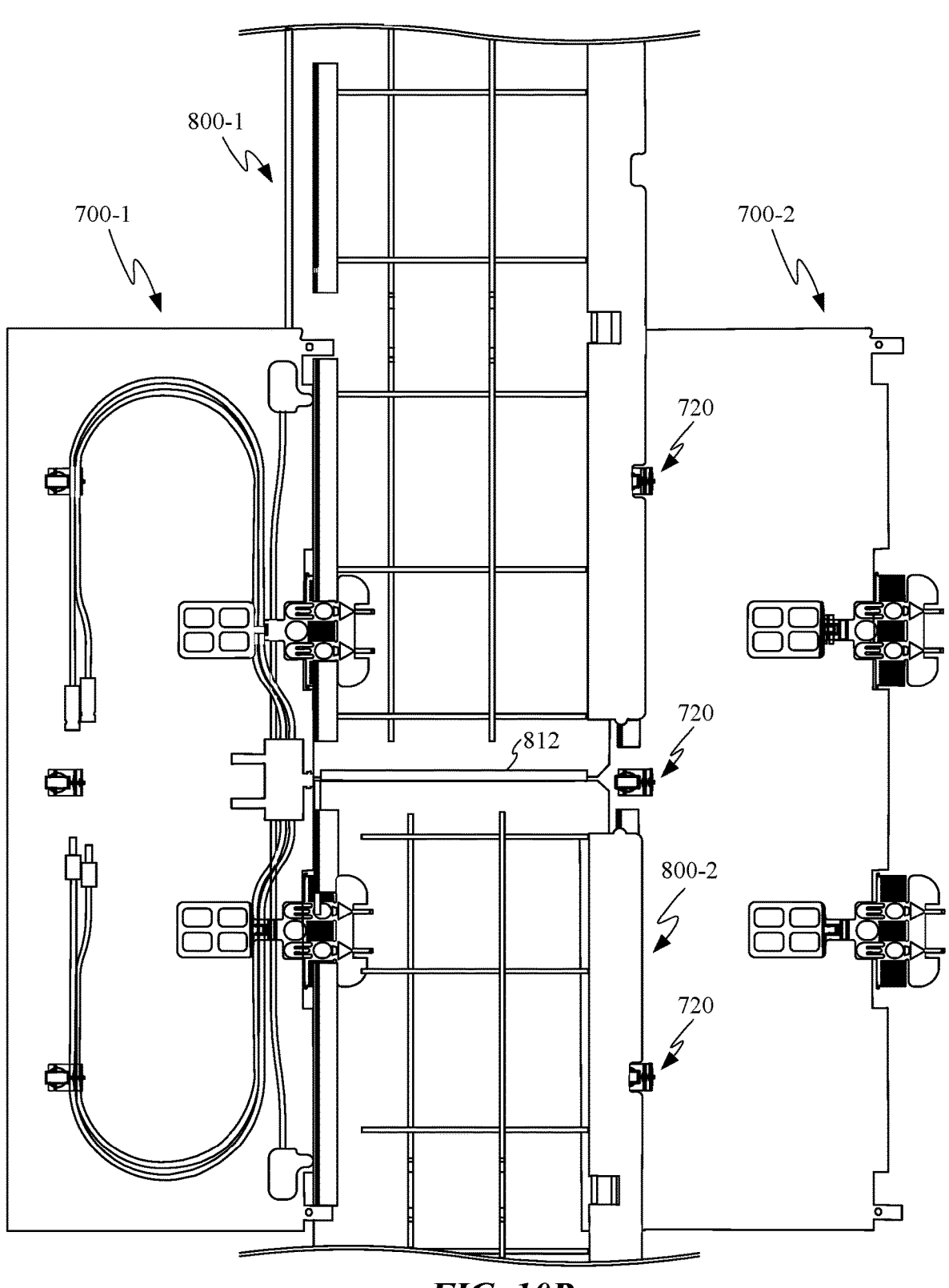

FIGS. 10A-10B show different combinations of PV and non-PV roofing tiles. In particular, FIG. 10A shows how a PV roofing tile 700 engages a non-PV roofing tile 800-1 and non-PV roofing tile 800-1 engages non-PV roofing tile 800-2. The coupling between PV roofing tile 700 and non-PV roofing tile 800 in FIG. 9A works in the same way as the coupling between PV roofing tile 700 and non-PV roofing tile 800-1 in FIG. 10A. The coupling between non-PV roofing tile 800-1 and non-PV roofing tile 800-2 is achieved by front bracket segments 810-1 and 810-2 of non-PV roofing tile 800-2 engaging the opening defined by u-shaped rear bracket 808 of non-PV roofing tile 800-1. Please note that this coupling configuration is shown in greater detail in FIG. 8C.

FIG. 10B shows another combination of PV and non-PV roofing tiles where PV roofing tiles 700-1 and 700-2 are offset by a half tile relative to non-PV roofing tiles 800-1 and 800-2. FIG. 10B also shows how water channel 812 covers a gap between adjacent non-PV roofing tiles 800-1 and 800-2. It should be noted that examples are given of two, three or four roofing tiles coupled together it should be appreciated that a much larger mixture of PV and non-PV roofing tiles would be arranged in rows or courses side by side, where roofing tiles on each row are offset from the row immediately above and below.

Figure 11:
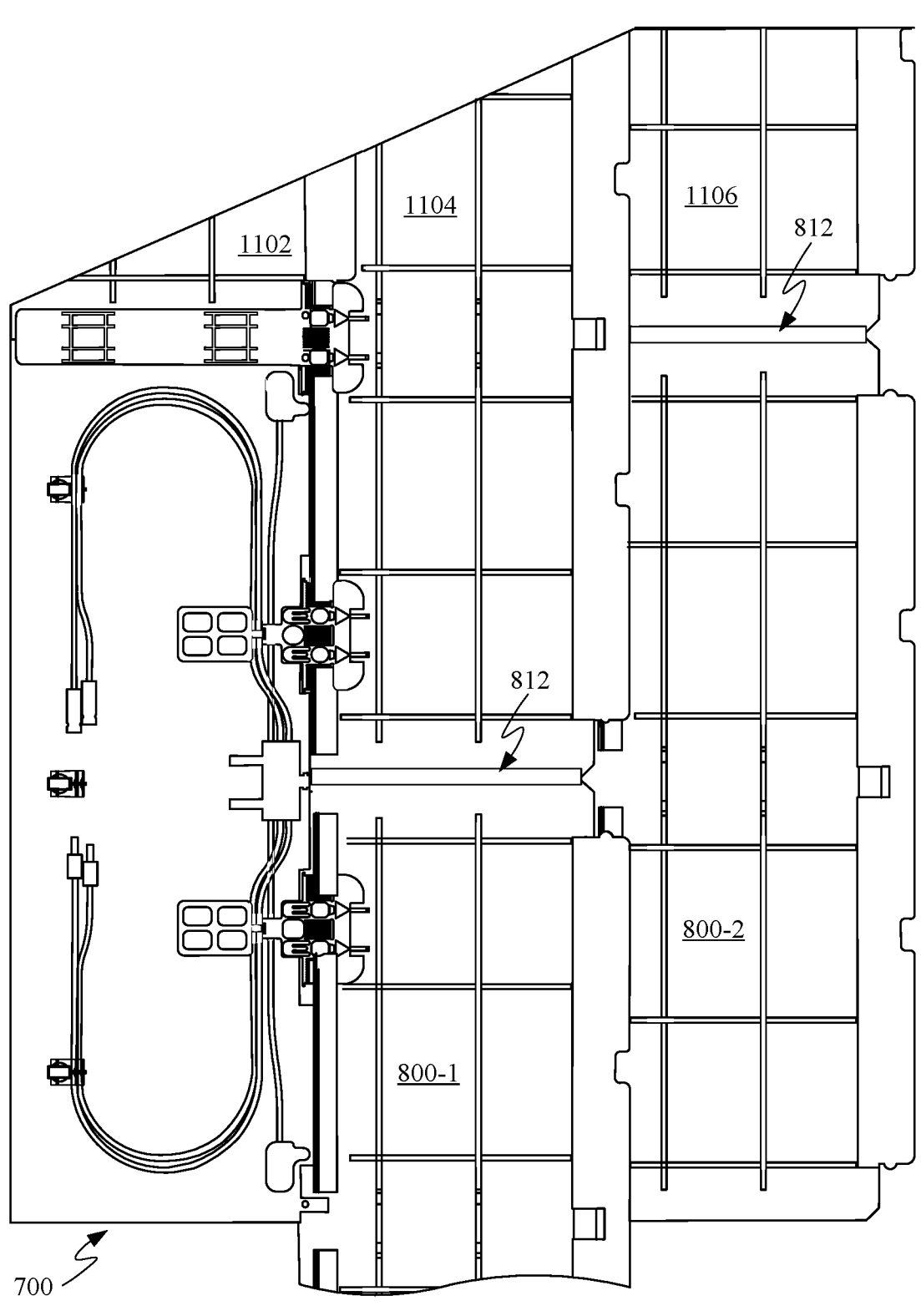
FIG. 11 shows the configuration depicted in FIG. 10A with the addition of flashing pieces.

FIG. 11 shows the configuration depicted in FIG. 10A with the addition of trimmed non-PV roofing tiles 1102, 1104 and 1106. Trimmed non-PV roofing tiles 1102, 1104 and 1106 can be produced by cutting a full non-PV roofing tile to fit a smaller area than it would otherwise fit in. While trimmed non-PV roofing tiles 1102, 1104 and 1106 are shown cut into triangular, trapezoidal and rectangular geometries many other geometries are possible. For example, holes for accommodating exhaust vents and other roof top obstacles could be cut into a non-PV roofing tile. In cases where the top row of tiles would otherwise extend past an apex of the roof, a height of the non-PV roofing tiles can be reduced resulting in rectangular roofing tiles with a larger aspect ratio. This works particularly well because non-PV roofing tiles include a standoff or in some embodiments multiple standoffs that allow trimmed non-PV roofing tiles cut from a non-PV roofing tile to include a sufficient amount of standoff materials to maintain a desired amount of standoff from the roofing substrate. In some embodiments, non- PV roofing tiles can be cut as shown on site using circular saws or other portable saws to achieve a desired geometry.

FIG. 11 also shows non-PV roofing tiles 800-1 and 800-2 and how the non-PV tiles integrate with trimmed non-PV roofing tiles. In particular, water channels of non-PV roofing tiles are shown covering gaps between trimmed non-PV roofing tiles 1104 and 1106 and non-PV roofing tiles 800-1 and 800-2.

The foregoing descriptions of various embodiments have been presented only for purposes of illustration and description. They are not intended to be exhaustive or to limit the present system to the forms disclosed. Accordingly, many modifications and variations will be apparent to practitioners skilled in the art. Additionally, the above disclosure is not intended to limit the present system.

What is claimed is:

1. A photovoltaic (PV) roofing tile, comprising:
a protective cover;
a PV tile backer;
a plurality of solar cells disposed between the protective cover and the PV tile backer;
a foot, comprising:
a coupling assembly positioned at a first end of the foot, wherein the coupling assembly defines a plurality of adjacent retaining features configured to receive one or more portions of a roofing tile adjacent to the PV roofing tile to mechanically and removably couple the PV roofing tile to the roofing tile adjacent to the PV roofing tile; and
a standoff coupled to a downward facing surface of the PV tile backer and positioned closer to a second end of the foot than the coupling assembly, wherein the second end of the foot is opposite the first end of the foot; and
a tile hook attached to the downward facing surface of the PV tile backer, wherein the tile hook comprises one or more deflectable surfaces configured to deflect to create an interference fit between the tile hook and opposing walls defining one of the plurality of retaining features of the coupling assembly.

2. The PV roofing tile of claim 1, wherein the coupling assembly further comprises a plurality of fastener openings, each of the plurality of fastener openings being configured to receive a fastener securing the foot to a roofing substrate.

3. The PV roofing tile of claim 1, wherein the coupling assembly comprises a plurality of angled surfaces configured to guide the one or more portions of the adjacent roofing tile into one or more of the plurality of adjacent retaining features during a roof installation.

4. The PV roofing tile of claim 1, wherein the coupling assembly comprises a plurality triangular alignment features that separate the plurality of adjacent retraining features and help guide the one or more portions of the roofing tile into one or more of the plurality of adjacent retaining features.

5. The PV roofing tile of claim 4, wherein each of the triangular alignment features, comprises a cable guide preventing wires routed in front of the coupling assembly from blocking the plurality of adjacent retaining features.

6. The PV roofing tile of claim 1, wherein the tile hook is configured to engage a central one of a plurality of adjacent retaining features of a coupling assembly of a foot of a PV roofing tile down-roof of the PV roofing tile.

7. The PV roofing tile of claim 1, further comprising a plurality of hooks attached to the downward facing surface of the PV tile backer.

8. The PV roofing tile of claim 6, wherein the tile hook defines a plurality of wire retaining channels.

9. The PV roofing tile of claim 1, wherein an upward facing surface of the coupling assembly defines a plurality of adjacent slots and wherein the PV tile backer comprises a plurality of parallel protrusions extending laterally from one side of the PV tile backer and a subset of the plurality of parallel protrusions extend into the plurality of adjacent slots of the coupling assembly to secure the coupling assembly to the PV tile backer of the PV roofing tile.

10. The PV roofing tile of claim 9, wherein a first slot of the plurality of slots is defined by a first cantilevered beam, a second cantilevered beam and a cross beam.

11. The PV roofing tile of claim 10, wherein a first protrusion of the subset of the plurality of parallel protrusions extends into the first slot and the first cantilevered beam applies a first force in a first direction to a distal end of the first protrusion, the second cantilevered beam applies a second force in the first direction to a proximal end of the first protrusion and the cross beam opposes is positioned between the first and second cantilevered beams and applies a third force in a second direction opposite the first direction.

12. The PV roofing tile of claim 1, wherein each foot further comprises a neck portion joining the standoff to the coupling assembly and leaving a gap between the neck portion and the PV tile backer, wherein the gap is sized to accommodate passage of one or more electrical cables.

13. The PV roofing tile of claim 1, wherein outboard retaining features of the plurality of adjacent retaining features are configured to receive adjacent front bracket segments of a non-PV roofing tile up roof from the PV roofing tile.

14. The PV roofing tile of claim 1, wherein the plurality of solar cells comprises a first edge busbar positioned near an edge of a first surface and a second edge busbar positioned near an opposite edge of a second surface, and wherein the plurality of solar cells are arranged in such a way that the first edge busbar of a first solar cell overlaps the second edge busbar of an adjacent solar cell, thereby resulting in the plurality of solar cells forming a serially coupled string.

15. The PV roofing tile of claim 1, wherein the standoff comprises a first surface in direct contact with the PV tile backer and a second surface opposite the first surface that is configured to contact a roofing substrate.

16. The PV roofing tile of claim 15, wherein the first surface is anti-parallel with the second surf ace.

17. The PV roofing tile of claim 1, wherein the plurality of retaining features comprises a central retaining feature defined by opposing sidewalls and a ridged top wall, wherein the ridged top wall is configured to engage a hook portion of a tile hook disposed on a PV roofing tile up-roof from the PV roofing tile.

18. The PV roofing tile of claim 1, wherein the plurality of retaining features comprises a first outboard retaining feature comprising a first ridged top wall and a first sidewall facing a first direction and a second outbound retaining feature comprising a second ridged top wall and a second sidewall facing a second direction opposite the first direction.

19. The PV roofing tile of claim 1, wherein the foot is configured to prevent upward movement of one or more portions of the roofing tile adjacent to the PV roofing tile.

20. The PV roofing tile of claim 1, wherein the roofing tile adjacent to the PV roofing tile is cantilevered.

* * * * *